(12) United States Patent
Lee

(10) Patent No.: US 11,706,067 B2
(45) Date of Patent: Jul. 18, 2023

(54) AUGMENTED REALITY GENERATING DEVICE, AUGMENTED REALITY DISPLAY DEVICE, AND AUGMENTED REALITY SYSTEM

(71) Applicant: SAMSUNG ELECTRONICS CO., LTD., Suwon-si (KR)

(72) Inventor: Jaesup Lee, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 352 days.

(21) Appl. No.: 17/021,518

(22) Filed: Sep. 15, 2020

(65) Prior Publication Data
US 2021/0351965 A1 Nov. 11, 2021

(30) Foreign Application Priority Data

May 11, 2020 (KR) .................. 10-2020-0056148

(51) Int. Cl.
| | |
|---|---|
| *H04W 4/00* | (2018.01) |
| *H04L 27/227* | (2006.01) |
| *H04W 4/029* | (2018.01) |
| *H01Q 1/27* | (2006.01) |
| *H04B 14/00* | (2006.01) |
| *G06T 19/00* | (2011.01) |

(52) U.S. Cl.
CPC ......... *H04L 27/2275* (2013.01); *H01Q 1/273* (2013.01); *H04B 14/002* (2013.01); *H04W 4/029* (2018.02); *G06T 19/006* (2013.01)

(58) Field of Classification Search
None
See application file for complete search history.

(56) References Cited

U.S. PATENT DOCUMENTS

| | | | |
|---|---|---|---|
| 9,092,898 | B1 | 7/2015 | Fraccaroli et al. |
| 9,269,152 | B1* | 2/2016 | Worley, III ............ G06F 3/011 |
| 9,576,398 | B1* | 2/2017 | Zehner ................ G02B 27/017 |
| 10,516,302 | B2 | 12/2019 | Lee et al. |
| 10,873,800 | B1* | 12/2020 | Khaleghimeybodi ...................... G02B 27/017 |
| 11,320,527 | B1* | 5/2022 | DeSalvo ................ G01S 13/88 |
| 11,320,588 | B1* | 5/2022 | Mazed .................. G16H 40/63 |
| 11,474,362 | B2* | 10/2022 | Schowengerdt ... G02B 27/0081 |
| 11,480,801 | B1* | 10/2022 | Morris ...................... A61F 9/02 |
| 2011/0216192 | A1* | 9/2011 | Leung ...................... H04N 7/18 348/169 |
| 2015/0040074 | A1* | 2/2015 | Hofmann .............. G06T 19/006 715/852 |
| 2016/0005233 | A1* | 1/2016 | Fraccaroli ............ G06F 3/0487 345/633 |

(Continued)

FOREIGN PATENT DOCUMENTS

| | | |
|---|---|---|
| KR | 10-2017-0119482 A | 10/2017 |
| KR | 10-2017-0125442 A | 11/2017 |
| KR | 10-2019-0077255 A | 7/2019 |

OTHER PUBLICATIONS

Communication dated Jun. 16, 2021, from the European Patent Office in European Application No. 20216483.6.

*Primary Examiner* — Bob A Phunkulh
(74) *Attorney, Agent, or Firm* — Sughrue Mion, PLLC

(57) ABSTRACT

An augmented reality (AR) system time-reverses a detection signal and a data signal based on a location detection signal, and outputs the time-reversed detection signal and data signal. Accordingly, data transmission efficiency may increase.

20 Claims, 26 Drawing Sheets

(56) References Cited

U.S. PATENT DOCUMENTS

| | | | |
|---|---|---|---|
| 2016/0071325 A1* | 3/2016 | Callaghan | H04W 4/02 |
| | | | 345/633 |
| 2016/0217623 A1* | 7/2016 | Singh | G09G 5/00 |
| 2017/0294051 A1* | 10/2017 | Harviainen | G06T 13/205 |
| 2017/0302109 A1 | 10/2017 | Lee et al. | |
| 2018/0059787 A1* | 3/2018 | Keller | G06F 3/011 |
| 2018/0373326 A1 | 12/2018 | Gatson et al. | |
| 2019/0005723 A1 | 1/2019 | Denman et al. | |
| 2019/0020530 A1* | 1/2019 | Au | H04L 27/362 |
| 2019/0065027 A1 | 2/2019 | Hauenstein et al. | |
| 2019/0222279 A1* | 7/2019 | Xi | H04B 7/0408 |
| 2020/0020221 A1* | 1/2020 | Cutler | H04W 4/70 |
| 2020/0267376 A1* | 8/2020 | Iwasa | G09G 5/006 |
| 2021/0075526 A1* | 3/2021 | Pefkianakis | H04B 7/088 |
| 2021/0185363 A1* | 6/2021 | Paiement | H04L 67/131 |
| 2022/0019284 A1* | 1/2022 | Kaifosh | G06F 3/016 |
| 2022/0297719 A1* | 9/2022 | Mittal | B60W 40/09 |
| 2022/0337316 A1* | 10/2022 | Croughwell, III | G06F 3/14 |
| 2022/0343704 A1* | 10/2022 | Hill | H04W 4/02 |

\* cited by examiner

FIG. 14
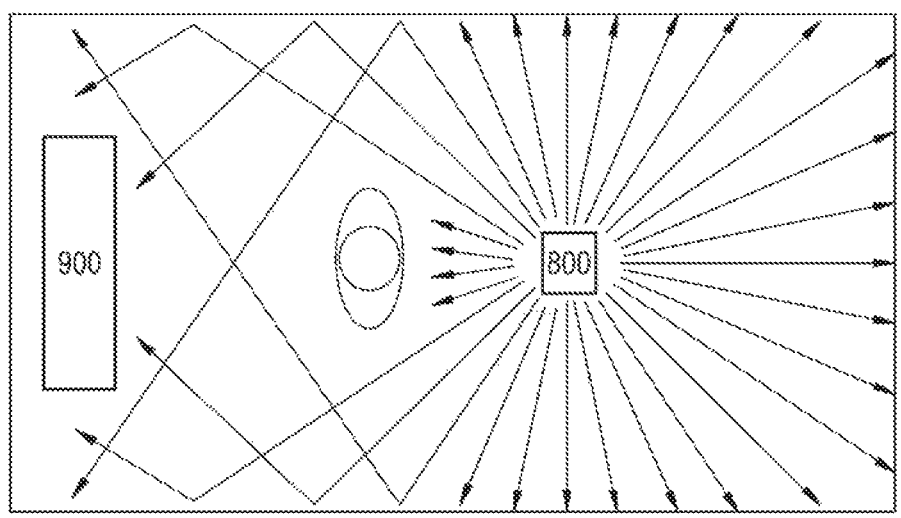
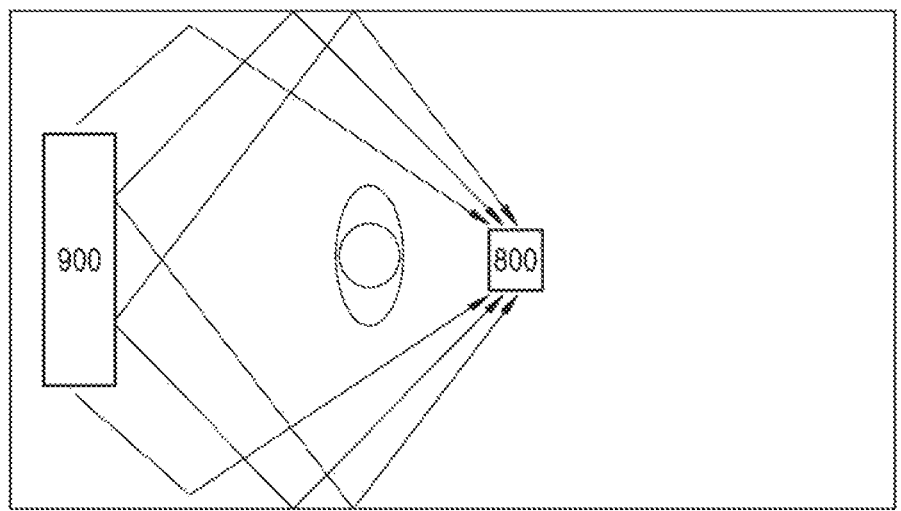

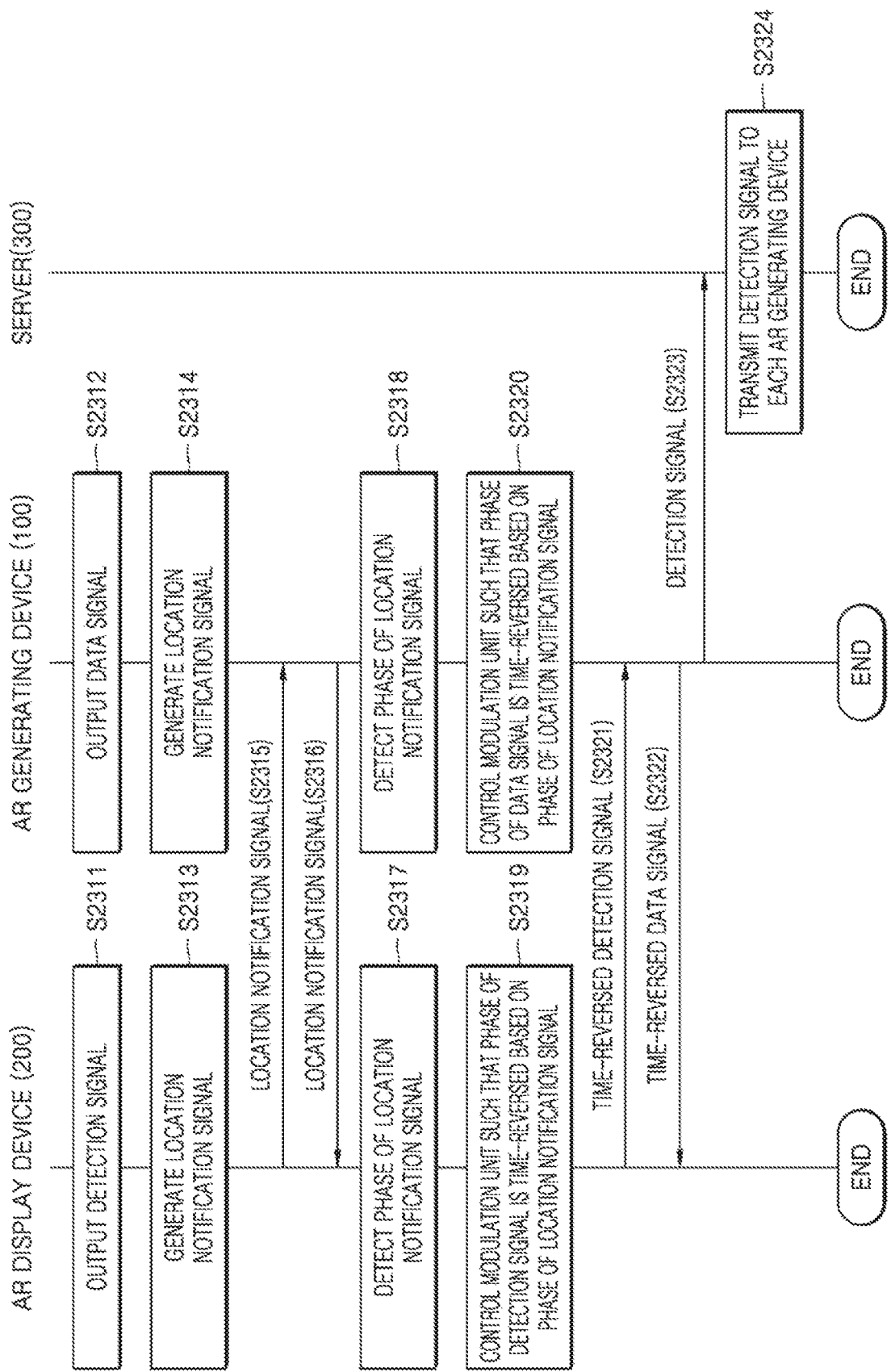

AUGMENTED REALITY GENERATING DEVICE, AUGMENTED REALITY DISPLAY DEVICE, AND AUGMENTED REALITY SYSTEM

CROSS-REFERENCE TO RELATED APPLICATION

This application claims priority from Korean Patent Application No. 10-2020-0056148, filed on May 11, 2020, in the Korean Intellectual Property Office, the disclosure of which is incorporated herein by reference in its entirety.

BACKGROUND

1. Field

Apparatuses and methods consistent with example embodiments relate to augmented reality (AR) generating devices, AR display devices, and AR systems.

2. Description of Related Art

Augmented Reality (AR) is a field of virtual reality (AR) and is a technology to overlay a real world seen by a user with a virtual world and additional information and display a single image.

AR uses a virtual environment created by computer graphics, but it is based on a real environment. Computer graphics is used to provide information necessary for the real environment or to provide a virtual object that does not exist in the real environment. The distinction between the real environment and a virtual screen may be blurred by overlapping a two-dimensional (2D) or three-dimensional (3D) virtual image with a live action video viewed by a user.

Recently, as the data size of virtual objects has increased, research into a technology capable of significantly reducing latency of data transmission while increasing a data rate may be required.

In addition, research into a technology capable of significantly reducing the size of an AR providing device while transmitting a large amount of data may be required.

SUMMARY

Provided are an augmented reality (AR) generating device, an AR display device, and an AR system that are capable of significantly reducing latency of data transmission while increasing a data rate of a data signal including a virtual object.

Provided are an AR generating device, an AR display device, and an AR system that are capable of significantly reducing the size of the device while transmitting a large amount of data.

Provided are an AR generating device, an AR display device, and an AR system that are capable of interacting between a plurality of AR providing devices.

The technical problem to be achieved by the present embodiment is not limited to the above technical problems, and other technical problems may be inferred from the following examples.

Additional aspects will be set forth in part in the description which follows and, in part, will be apparent from the description, or may be learned by practice of the presented embodiments of the disclosure.

According to an aspect of an example embodiment, there is provided an augmented reality (AR) generating device including: a modulator configured to modulate a first phase of at least one data signal comprising information about an AR object; a phase detector configured to detect a second phase of at least one location notification signal received from an AR display device; a processor configured to control the modulator to time-reverse the first phase of the at least one data signal based on the second phase of the at least one location notification signal; and a plurality of antennas configured to receive the at least one location notification signal in a first frequency band from the AR display device and transmit the time-reversed at least one data signal to the AR display device in a second frequency band different from the first frequency band.

The plurality of antennas may include: a plurality of first band antennas configured to receive the at least one location notification signal; and a plurality of second band antennas configured to receive a detection signal for generating the AR object from the AR display device and transmit the time-reversed at least one data signal to the AR display device.

The plurality of first band antennas may be ring-shaped, and at least one of the plurality of second band antennas may be arranged inside any one of the plurality of first band antennas.

The at least one location notification signal may include a first location notification signal, and the processor may be further configured to calculate a time-reversed phase of a first data signal by multiplying a time-reversed phase of the first location notification signal by a preset factor.

The at least one location notification signal may further include a second location notification signal, and the processor may be further configured to obtain a difference in a number of first peaks between the first location notification signal and the second location notification signal, calculate a number of second peaks by multiplying the difference in the number of first peaks by the preset factor, and calculate a time-reversed phase of a second data signal based on the number of second peaks.

The processor may be further configured to set a value obtained by dividing a frequency value of the second frequency band by a frequency value of the first frequency band as the preset factor.

The processor may be further configured to adjust a beamforming angle of the at least one data signal based on a received signal strength indicator (RSSI) of the at least one data signal.

The second frequency band may be set larger than the first frequency band.

The at least one location notification signal may be a beacon signal.

According to an aspect of another example embodiment, there is provided an augmented reality (AR) display device including: a modulator configured to modulate a first phase of at least one detection signal comprising information about an AR object; a phase detector configured to detect a second phase of at least one location notification signal received from an AR generating device; a processor configured to control the modulator to time-reverse the first phase of the at least one detection signal based on the second phase of the at least one location notification signal; and a plurality of antennas configured to receive the at least one location notification signal from the AR generating device in a first frequency band and transmit the time-reversed at least one detection signal to the AR generating device in a second frequency band different from the first frequency band.

The plurality of antennas may include: a first band antenna configured to receive the at least one location notification signal; and a plurality of second band antennas configured to receive a data signal from the AR generating device and transmit the time-reversed at least one detection signal to the AR generating device.

The first band antenna may be ring-shaped, and at least one of the plurality of second band antennas may be disposed inside the first band antenna.

The at least one detection signal may include a first detection signal, and the at least one location notification signal may include a first location notification signal. The processor may be further configured to calculate a time-reversed phase of the first detection signal by multiplying a time-reversed phase of the first location notification signal by a preset factor.

The at least one detection signal may further include a second detection signal. The processor may be further configured to calculate a time-reversed phase of the second detection signal based on the time-reversed phase of the first detection signal and an interval between band antennas included in the plurality of antennas.

The processor may be further configured to set a value obtained by dividing a frequency value of the second frequency band by a frequency value of the first frequency band as the preset factor.

The processor may be further configured to adjust a beamforming angle of the at least one detection signal based on a received signal strength indicator (RSSI) of the at least one detection signal.

The second frequency band may be set larger than the first frequency band.

The at least one location notification signal may be a beacon signal.

According to an aspect of another example embodiment, there is provided an augmented reality (AR) system including a server, a plurality of AR generating devices wirelessly connected to the server, and a plurality of AR display devices that are wirelessly connected to the plurality of AR generating devices, respectively. Each of the plurality of AR display device may be configured to: output at least one detection signal by detecting information for generating an AR object; detect a phase of at least one location notification signal received from the plurality of AR generating devices that are wirelessly connected to the plurality of AR display devices in a first frequency band, respectively; time-reverse the at least one detection signal based on the phase of the at least one location notification signal; and transmit the time-reversed at least one detection signal to each of the plurality of AR generating devices in a second frequency band different from the first frequency band. Each of the plurality of AR generating devices may be configured to transmit the at least one detection signal to the server in a third frequency band different from the first frequency band and the second frequency band.

The server may be configured to transmit the at least one detection signal to a first AR generating device of the plurality of AR generating devices when receiving the at least one detection signal from a second AR generating device of the plurality of AR generating devices.

BRIEF DESCRIPTION OF THE DRAWINGS

The above and/or other aspects will be more apparent by describing certain example embodiments, with reference to the accompanying drawings, in which:

FIG. 14 is a diagram illustrating a method of receiving a none line of sight (NLOS) signal according to an embodiment;

FIG. 25 is a diagram illustrating an operation method of an AR system according to an embodiment.

DETAILED DESCRIPTION

Figure 1:
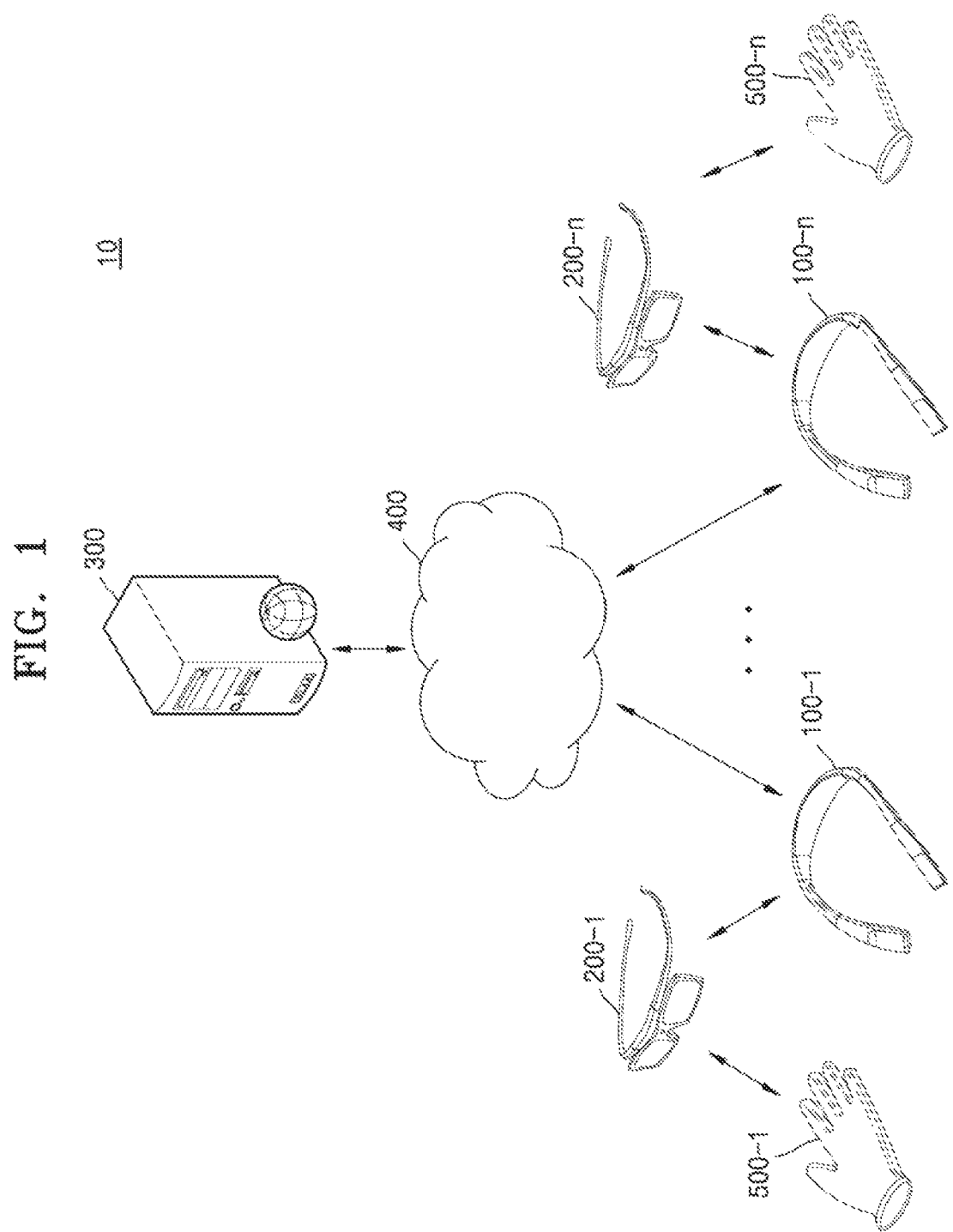
FIG. 1 shows an augmented reality (AR) system according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The phrases "in some embodiments" or "in an embodiment" appearing in various places in the specification are not necessarily all referring to the same embodiment.

Some embodiments of the present disclosure may be represented by functional block configurations and various processing steps. Some or all of these functional blocks may be implemented in various numbers of hardware and/or software configurations that perform particular functions. For example, the functional blocks of the present disclosure may be implemented by one or more microprocessors or by circuit configurations for a given function. In addition, for example, the functional blocks of the present disclosure may be implemented in various programming or scripting languages. The functional blocks may be implemented in algorithms running on one or more processors. In addition, the present disclosure may employ the technics for electronic configuration, signal processing, and/or data processing. Terms such as "mechanism", "element", "means" and "configuration" may be used widely and are not limited to mechanical and physical configurations.

In addition, the connecting lines or connecting members between the components shown in the drawings are merely illustrative of functional connections and/or physical or circuit connections. In an actual device, the connections between components may be represented by various functional connections, physical connections, or circuit connections that are replaceable or added.

In addition, terms including ordinal numbers, such as first and second, as used herein may be used to describe various components, but the components should not be limited by the terms. The terms are used only for the purpose of distinguishing one component from another.

In the following embodiments, a technology providing augmented reality (AR) may be applied to a technology providing virtual reality (VR) and mixed reality (MR). In other words, the following technology may also be applied to a technology providing eXtended Reality (XR).

VR may refer to a specific environment or situation, or technology itself, which is similar to reality but not real. MR may mean a technology that combines the virtual world with the real world to create new information such as a new environment or visualization.

FIG. 1 shows an augmented reality (AR) system 10 according to an embodiment.

Referring to FIG. 1, the AR system 10 may include a plurality of AR generating devices 100-1 . . . 100-n, a plurality of AR display devices 200-1 . . . 200-n, and a server 300. According to an embodiment, the AR system 10 may further include a plurality of input devices 500-1 . . . 500-n, referred to as 500 if there is no need to distinguish below.

An AR display device 200 may be a display device worn on a user's head to provide an AR object to the user's field of view. For example, the AR display device 200 is a head mounted device (HMD), but may be in the form of at least one of glasses, goggles, and a helmet cap, but is not limited thereto.

The AR object may refer to a virtual object that is overlaid on a physical environment of a user. For example, the AR object may be a graphic image, text, or image that is overlaid on a real environment of the user, but is not limited thereto.

The AR display device 200 may output a detection signal for generating the AR object. For example, the AR display device 200 may output motion information of the user, gaze information, focus information, an ambient temperature of a device, inertia information, etc. as the detection signal.

According to an embodiment, when the AR system 10 further includes the plurality of input devices 500-1 . . . 500-n, the detection signal may be provided by the input devices 500-1 . . . 500-n. The AR display device 200 may transmit the detection signal to an AR generating device 100. For example, the AR display device 200 may receive a location notification signal from the AR generating device 100 through a first frequency band. The location notification signal may be a beacon signal that serves to announce the presence of the AR generating device 100, and may include location information (e.g., an Internet Protocol (IP) address, a media access control (MAC) address, a device ID) of the AR generating device 100. Also, the AR display device 200 may time-reverse the detection signal based on the location notification signal. In addition, the AR display device 200 may transmit the time-reversed signal to the AR generating device 100 through a second frequency band.

The AR generating device 100 may generate the AR object based on the detection signal received from the AR display device 200.

The AR generating device 100 may provide either one or both of a video type AR object and a see-through type AR object. The video type AR object may refer to virtual content that is overlaid on a previously stored image or an image received through a camera. The see-through type AR object may refer to virtual content displayed on a transparent or translucent material display such that the user may simultaneously view the real world and the AR object.

The AR generating device 100 may provide a data signal including information about the AR object.

The AR generating device 100 may render virtual content including the AR object based on the detection signal received from the AR display device 200. For example, the virtual content may be a graphical user interface (GUI), text, game, music, movie, radio, etc., but is not limited thereto.

When rendering the virtual content, the AR generating device 100 may provide a realistic perspective by mapping the AR object to the virtual depth of a display based on detection information (e.g., a pupil movement, focal length of the user, etc.)

The AR generating device 100 may update the AR object based on the detection signal. For example, the AR generating device 100 may load or unload the AR object based on a user's gesture. As another example, the AR generating device 100 may change a form of the AR object based on the user's gesture. As another example, the AR generating device 100 may rotate, move, and scale the AR object displayed on the display based on a head movement of the user, a pupil movement, etc.

The AR system 10 of the present disclosure has a relatively complex and larger volume configuration such as a rendering engine disposed in the AR generating device 100, and a relatively simple and smaller volume configuration such as a sensor disposed in the AR display device 200, thereby significantly reducing the weight of the AR display device 200. Accordingly, the AR system 10 of the present disclosure has an effect of significantly increasing the wearing comfort of the AR display device 200 and increasing the user convenience.

The AR generating device 100 may transmit the data signal including the AR object to the AR display device 200. Specifically, the AR generating device 100 may receive the location notification signal from the AR display device 200 through the first frequency band. In addition, the AR generating device 100 may time-reverse the data signal based on the location notification signal. Also, the AR generating device 100 may transmit the time-reversed data signal to the AR display device 200 through the second frequency band.

The AR display device 200 may display the AR object on the display based on the data signal. According to an embodiment, the AR display device 200 may include the display capable of adjusting transparency, and may adjust the transparency of the display according to an AR mode, a VR mode, or a MR mode. For example, the AR display device 200 may allow external light to pass through, by setting the transparency of the display to 100% in the AR mode. As another example, the AR display device 200 may block the external light by setting the transparency of the display to 0% in the VR mode. As another example, the AR display device 200 may allow the external light to partially pass through, by setting the transparency of the display to 20 to 80% in the MR mode. According to an embodiment, the above-described mode change may be performed by the AR generating device 100.

Meanwhile, the plurality of AR generating devices 100-1 . . . 100-n may be connected to the server 300 through a network 400 to share information with each other.

Each AR generating device 100 may access the server 300 through the network 400. Each AR generating device 100 may transmit the detection signal received from the AR display device 200 to the server 300. Specifically, the AR generating device 100 may transmit the detection signal through a third frequency band.

The server 300 may receive the detection signal from the plurality of AR generating devices 100-1 . . . 100-n. The server 300 may include a modeling engine and may model AR based on a virtual reality modeling language (VRML). In addition, the server 300 may recognize the mutual relationship between the plurality of AR generating devices 100-1 . . . 100-n based on the detection signal, and process the AR object based on the relationship between the plurality of AR generating devices 100-1 . . . 100-n.

The server 300 may transmit the detection signal received from any one AR generating device 100 to the other AR generating device 100 through the third frequency band. For example, the server 300 may transmit a first detection signal received from the first AR generating device 100-1 to the second AR generating device 100-2 through the third frequency band.

In FIG. 1, the server 300 may include a group of one or more servers. Also, according to an embodiment, an access point (AP) may be further included in the AR system 10, between the server 300 and the network 400 and between the AR generating device 100 and the network 400.

Figure 2:
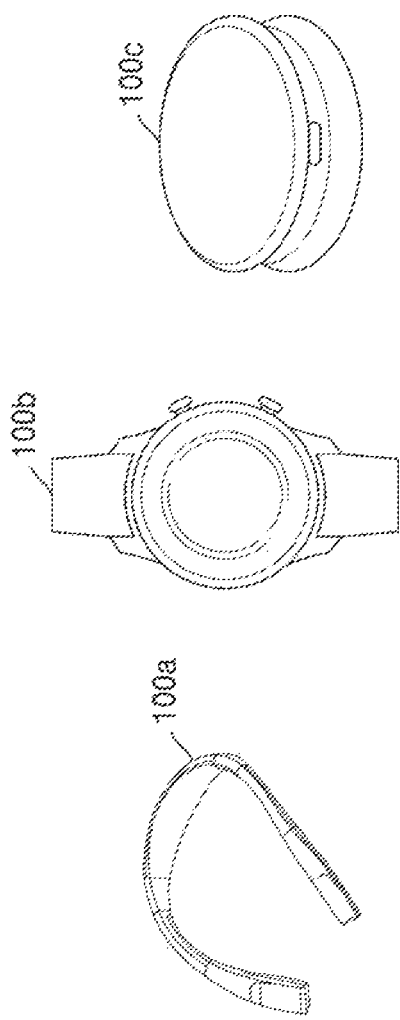
FIG. 2 shows examples of an AR generating device of FIG. 1.

FIG. 2 shows an example of the AR generating device 100 of FIG. 1.

Referring to FIG. 2, the AR generating device 100 of the present disclosure may be any one of a neckband type device 100a, a smart watch 100b, and a portable pocket type device 100c.

However, FIG. 2 is only an example of the AR generating device 100, the AR generating device 100 of the present disclosure is portable, and may be any one of a variety of devices in near field communication with the AR display device 200. For example, the AR generating device 100 may be any one of an accessory type wearable device such as a ring, a bracelet, an anklet, a necklace, etc., clothing such as electronic clothing, a portable communication device such as a smart phone, and a portable multimedia device.

Meanwhile, when the AR system 10 includes the plurality of AR generating devices 100-1 . . . 100-n, any one AR generating device 100 may be a device of the same type as or a different type from the other AR generating device 100. For example, the first AR generating device 100-1 and the second AR generating device 100-2 may be a neckband type device 100a. As another example, the first AR generating device 100-1 may be the neckband type device 100a, and the second AR generating device 100-2 may be a smart watch 100b.

Figure 3:
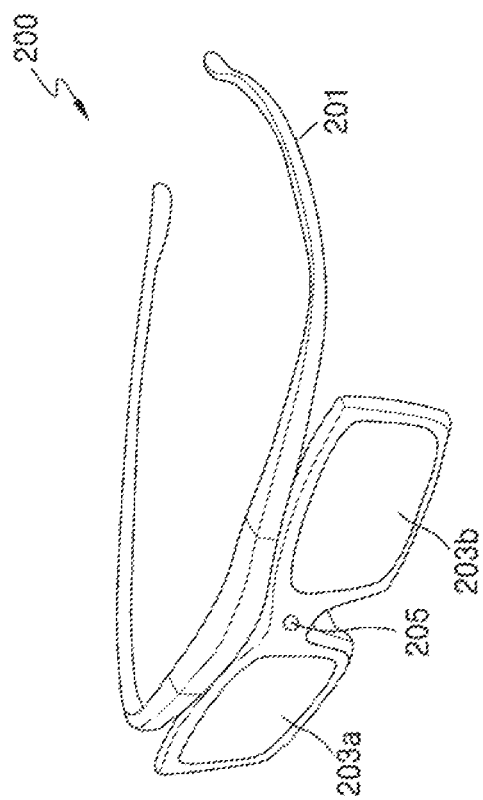
FIG. 3 shows an example of an AR display device of FIG. 1.

FIG. 3 shows an example of the AR display device 200 of FIG. 1.

Referring to FIG. 3, the AR display device 200 may be a head-mounted display (HMD) in the form of glasses or goggles.

The AR display device 200 may include a camera 205 on the front side. The camera 205 may be disposed on the front side of the AR display device 200 to obtain an external image in the gaze direction of a user. The camera 205 may obtain a still image and a video for the generation of an AR object.

The AR display device 200 may include one or more lenses 203a and 203b (referred to as 203 when there is no need to distinguish below). In an embodiment, the lens 203 may be formed of a transparent or translucent material. In another embodiment, the lens 203 may be formed of a material capable of adjusting transparency.

The lens 203 may operate as a display. The AR display device 200 may display the AR object through the lens 203. When the lens 203 is opaque, the AR display device 200 may overlay and output the AR object on an image received through the camera 205. When the lens 203 is transparent, the AR display device 200 may output the AR object in correspondence to distance information of real reality.

The AR display device 200 may output the AR object in a region corresponding to a user's viewing angle. For example, the user's viewing angle may be 45 degrees up and down, and 90 degrees left and right, but is not limited thereto. According to an embodiment, the region corresponding to the user's viewing angle may be the same as the entire lens region, or may be smaller than the entire lens region. Also, the region corresponding to the user's viewing angle may be determined or adjusted based on the distance from the user's eye to the lens 203.

A frame 201 may include a connection member and may be configured in a structure in which at least part of the frame 201 is foldable. In addition, the AR display device 200 may further include an elastic band such that the AR display device 200 is fixed to a user's head regardless of the size of the user's head.

Meanwhile, the components of FIG. 5 described later may be disposed inside or outside the frame 201.

Figure 4:
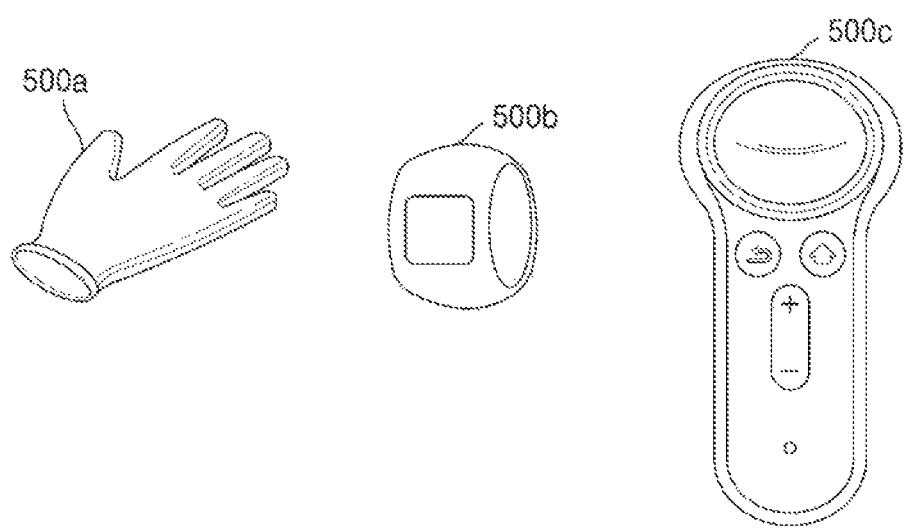
FIG. 4 shows examples of an input device of FIG. 1.

FIG. 4 shows an example of the input device 500 of FIG. 1.

Referring to FIG. 4, the input device 500 of the present disclosure may be any one of a smart glove 500a, a smart ring 500b, and a joystick 500c.

However, FIG. 4 is only an example of the input device 500, and the input device 500 may be, as a non-limiting example, any device capable of transmitting a detection signal to the AR display device 200. For example, the input device 500 may be any one of an accessory type wearable device such as a ring, a bracelet, an anklet, a necklace, etc., clothing such as electronic clothing, a portable communication device such as a smart phone, and a portable multimedia device.

Figure 5:
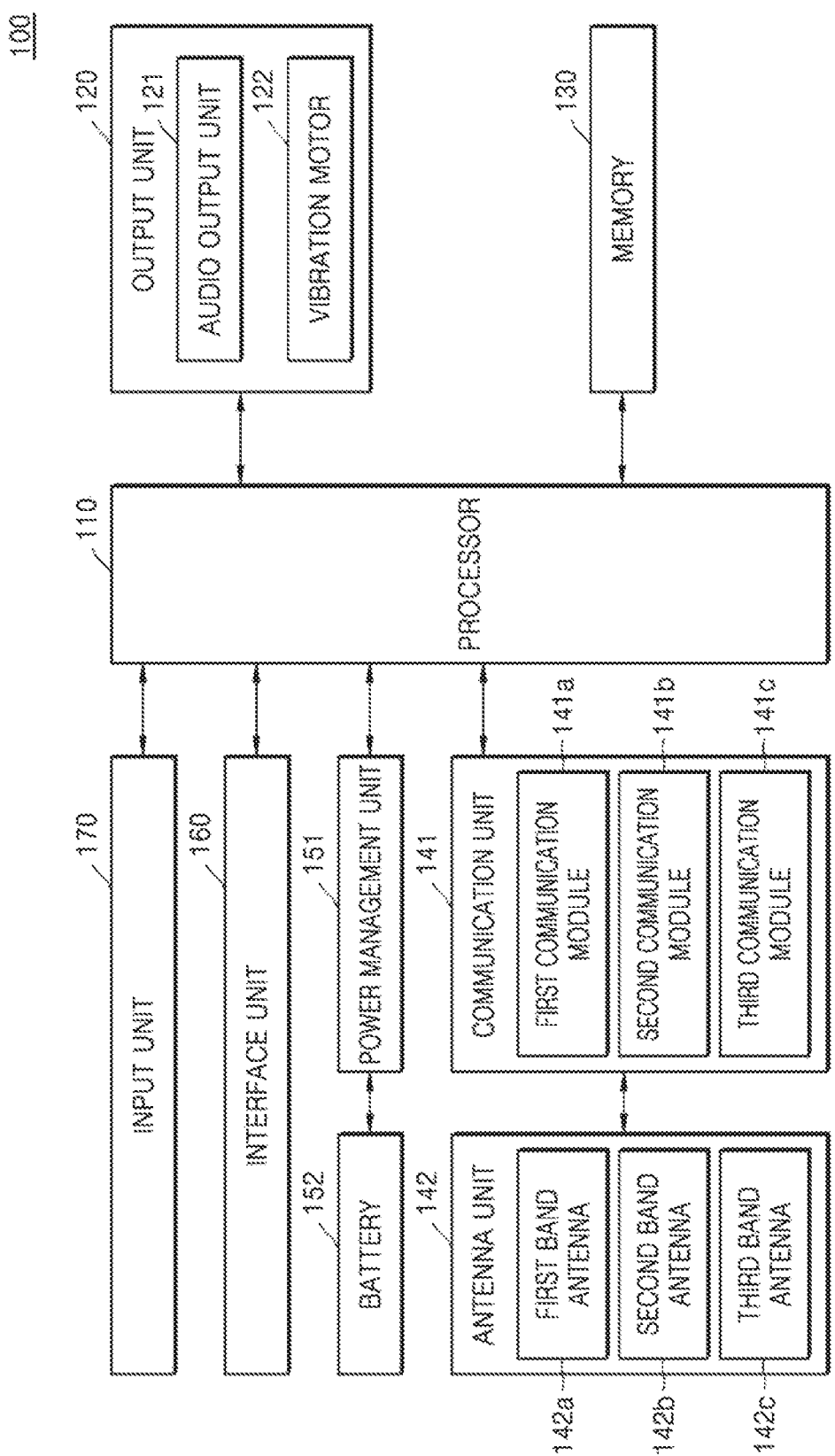
FIG. 5 is a block diagram of an AR generating device according to an embodiment.

FIG. 5 is a block diagram of the AR generating device 100 according to an embodiment.

Referring to FIG. 5, the AR generating device 100 may include a processor 110, an output unit (e.g., an output interface) 120, a memory 130, a communication unit (e.g., a communication interface, a transceiver, etc.) 141, an antenna unit (e.g., an antenna, a plurality of antennas, an antenna array, etc.) 142, a power management unit (e.g., a power controller, a power control circuit, etc.) 151, a battery 152, an interface unit 160 and an input unit (e.g., an input interface) 170.

The output unit 120 may include an audio output unit 121 (e.g., a speaker) and a vibration motor 122.

The audio output unit 121 may output an audio signal related to a function (e.g., message reception sound, notification sound, etc.) performed in the AR generating device 100. The sound output unit 121 may be configured in the form of an earphone that may be mounted on the user's ear. Alternatively, the sound output unit 121 may be configured in the form of a speaker.

The vibration motor 122 may output a vibration signal. For example, the vibration motor 122 may output the vibration signal corresponding to an audio signal or an image signal. In addition, when the input unit 170 is configured as a touch screen, the vibration motor 122 may output the vibration signal corresponding to a user's touch input.

The memory 130 may store virtual content that is a background of the AR object. The virtual content may be previously downloaded through the server 300. For example, the virtual content may be a game, a movie, etc., which is the background of the AR object, but is not limited thereto.

The memory 130 may store object information such as the shape, pattern, and color of the AR object. The object information may be previously stored in the memory 130 or updated by the server 300. For example, the object information may be the virtual content (e.g., game, movie, etc.) or shape, pattern, and color information of graphic image, text, user interface (GUI), icons, etc. that are overlaid on the real environment, but is not limited thereto.

The memory 130 may store a program for controlling the AR generating device 100. Further, the memory 130 may store identification information for identifying the user.

The memory 130 may include a storage medium of at least one type of a flash memory type, a hard disk type, a multimedia card micro type, a card type memory (e.g., a secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, or an optical disk.

The input unit 170 may receive a user input. The user input may include a command or request to initiate or end a certain function.

The input unit 170 may be configured as a key pad, a dome switch, a jog wheel, a jog switch, etc. Alternatively, the input unit 170 may be configured in the form of a touch pad. For example, the user's touch input may include a tap, double tap, hold, swipe, panning, or flick.

In an embodiment, the AR generating device 100 may receive a user's gesture input, speech input, and in this case, a camera and a microphone may function as the input unit 170.

The interface unit 160 may support a designated protocol that may be connected to an external electronic device by wire or wirelessly. In an embodiment, the interface unit 160 may include a high definition multimedia interface (HDMI), a universal serial bus (USB) interface, an SD card interface, an audio interface, etc.

Figure 6:
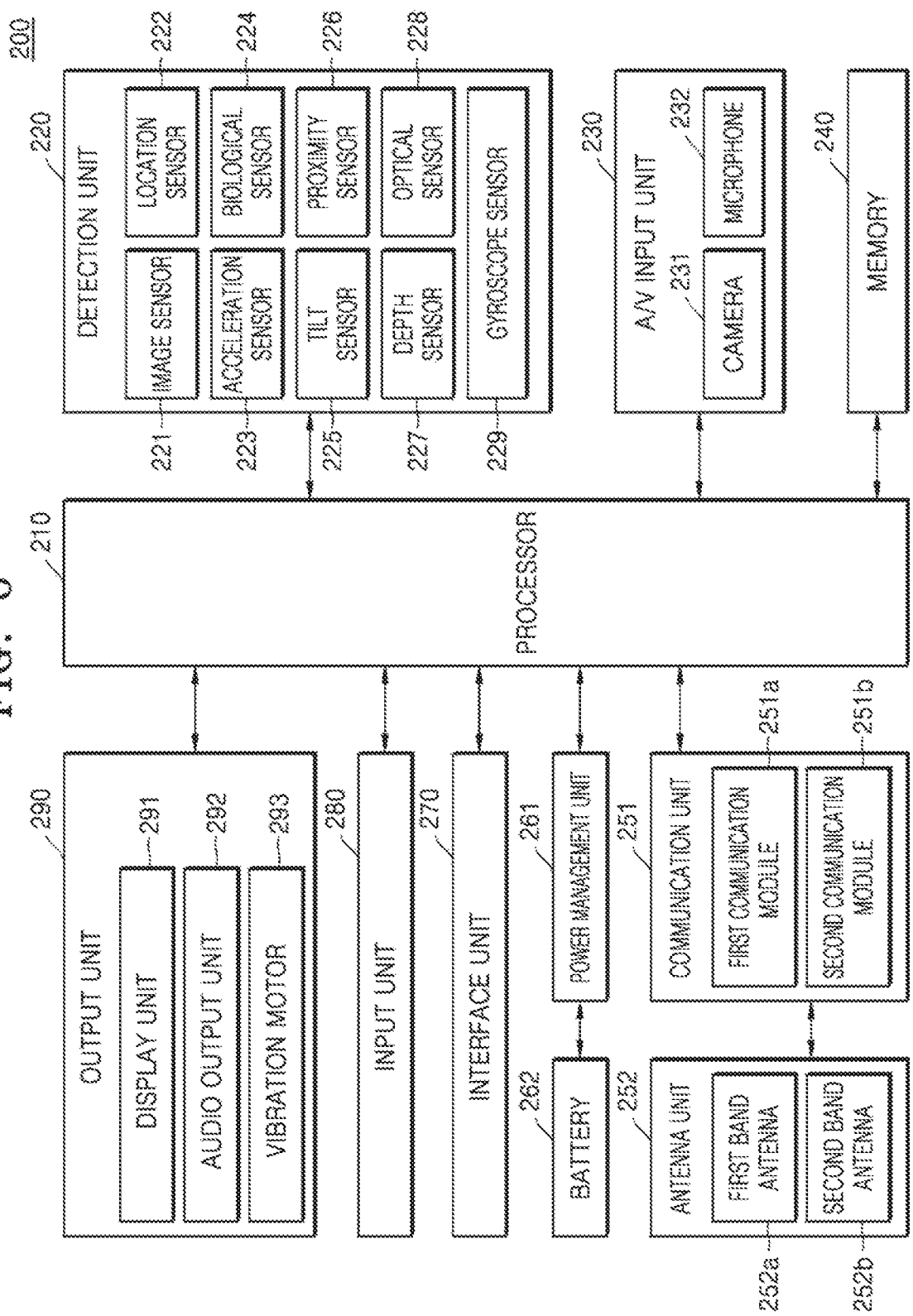
FIG. 6 is a block diagram of an AR display device according to an embodiment.

According to an embodiment, the interface unit 160 may be connected by wire to the interface unit 270 of FIG. 6 in the AR display device 200. When the interface unit 160 is connected by wire to the interface unit 270 in the AR display device 200, the AR generating device 100 may transmit a data signal to the AR display device 200 through the interface unit 160.

The power management unit 151 may manage power supplied to the AR generating device 100. For example, the power management unit 151 may include a power management integrated circuit (PMIC), a charger integrated circuit (IC), a battery or a fuel gauge, etc.

The battery 152 is a device for supplying power to at least one component of the AR generating device 100, and, for example, may include a non-rechargeable primary battery, a rechargeable secondary battery, a fuel battery, etc.

The communication unit 141 may communicate with the AR display device 200 and the server 300. To this end, the communication unit 141 may include a first communication module 141a, a second communication module 141b, and a third communication module 141c.

The first communication module 141a and the second communication module 141b may communicate with the AR display device 200. Further, the third communication module 141c may communicate with the server 300.

The first communication module 141a may communicate with the AR display device 200 through a first frequency band or radio band. In an embodiment, the first communication module 141a may be a Bluetooth Low Energy (BLE) communication module. Also, the first frequency band may be 2.4 GHz or 5.8 GHz. When the first communication module 141a is the BLE communication module, the AR generating device 100 may perform low power communication with the AR display device 200.

The second communication module 141b may communicate with the AR display device 200 through a second frequency band. In an embodiment, the second communication module 141b may be a broadband communication module supporting ultra high speed communication and near field communication. Also, the second frequency band may be 60 GHz. When the second communication module 141b is the broadband communication module supporting 60 GHz communication, the AR generating device 100 may transmit a large capacity file to the AR display device 200. In addition, a data rate of the AR generating device 100 may increase, and a latency may be reduced.

The third communication module 141c may communicate with the server 300 through a third frequency band. In an embodiment, the third communication module 141c may be a 5th Generation (5G) communication module. Also, the third frequency band may be 3.5 GHz or 28 GHz. When the third communication module 141c is the 5G communication module, the AR generation device 100 enables interaction between multiple users.

Meanwhile, the first communication module 141a to the third communication module 141c may be implemented as one chip or may be implemented as separate chips.

The antenna unit 142 may include a first band antenna 142a, a second band antenna 142b, and a third band antenna 142c.

The first band antenna 142a may be connected to the first communication module 141a. The first band antenna 142a may receive a first location notification signal from the AR display device 200 through the first frequency band. Also, the first band antenna 142a may transmit a second location notification signal to the AR display device 200 through the first frequency band. The first location notification signal and the second location notification signal may be beacon signals. When the first location notification signal is the beacon signal, the processor 110 may identify an ID of the first location notification signal. In an embodiment, the first location notification signal may include a universally unique identifier (UUID), and the processor 110 may identify the AR display device 200 corresponding to the AR generating device 100 based on the UUID.

The second band antenna 142b may be connected to the second communication module 141b. The second band antenna 142b may receive a detection signal from the AR display device 200 through the second frequency band. Also, the second band antenna 142b may transmit a data signal including AR object information to the AR display device 200 through the second frequency band.

The third band antenna 142c may be connected to the third communication module 141c. The third band antenna 142c may transmit the first detection signal to the server 300 through the third frequency band. Also, the third band antenna 142c may receive the second detection signal from the server 300 through the third frequency band. Subjects for generating the first detection signal and the second detection signal may be different. For example, the first detection signal may be generated by the first AR display device 200-1, and the second detection signal may be generated by the second AR display device 200-2 different from the first AR display device 200-1.

The processor 110 may generate the AR object based on the detection signal.

The detection signal may be provided from the AR display device 200 wirelessly connected to the AR generation device 100. For example, the detection signal may include image information obtained by a camera (a camera 231 in FIG. 6). Also, the detection signal may include head movement information of the user, gaze information, focus information, gesture information, etc.

The AR object may refer to a virtual object overlaid on a region corresponding to a user's viewing angle. For example, the AR object may include a graphic image, text, a GUI, an icon, etc., that are overlaid on the region corresponding to the user's viewing angle. Information about the AR object may be stored in the memory 130.

Meanwhile, generating the AR object may have the same meaning as rendering a virtual space of virtual content (e.g., a game, a movie, etc.) or a real space existing in the region corresponding to the user's viewing angle as a 3D space, and registering the AR object in the rendered 3D space.

The processor 110 may transmit a data signal including the AR object to the AR display device 200 through the antenna unit 142. The data signal may be an image signal or an image signal of the AR object registered in the rendered 3D space.

Meanwhile, the processor 110 may update the data signal including the AR object in real time based on the detection signal. For example, the processor 110 may change the shape of the AR object based on the detection signal, or rotate, move, and scale the AR object.

The processor 110 may transmit the updated data signal to the AR display device 200 through the antenna unit 142.

Meanwhile, the processor 110 may control the communication unit 141 and transmit the detection signal received from the AR display device 200 to the server 300. This is for the interaction between the plurality of AR display devices 200-1 . . . 200-n.

Meanwhile, each of the components of FIG. 5 may be configured as one or more components, the name of the component may vary depending on the type of the AR generating device 100. The AR generating device 100 of the present disclosure may be configured to include at least one of the above-described components, and some components may be omitted or additional other components may be further included.

FIG. 6 is a block diagram of the AR display device 200 according to an embodiment.

Referring to FIG. 6, the AR display device 200 may include a processor 210, a detection unit (e.g., a sensor, a plurality of sensors, etc.) 220, an audio/video (A/V) input unit 230, a memory 240, an output unit 290, an input unit 280, an interface unit 270, a power management unit 261, a battery 262, a communication unit 251, and an antenna unit 252.

The detection unit 220 may detect the state of the AR display device 200, the surrounding state of the AR display device 200, the state of a user wearing the AR display device 200, the movement of a user, etc. and output detection information as a detection signal. The detection signal output from the detection unit 220 may be used to generate an AR object.

When the user wears the AR display device 200, an image sensor 221 may be disposed at a location adjacent to the user's eye, thereby obtaining an image similar to an image recognized through the user's eye. Alternatively, the image sensor 221 may obtain a user's eye image (e.g., gaze, focal length, pupil size, eye blink, etc.)

A depth sensor 227 may detect a gesture on a 3D space of the user. For example, the depth sensor 227 may measure a depth value of a user's hand motion. The depth sensor 227 may measure the depth value using at least one of a time of flight (ToF) method, a stereoscopic vision method, and a structured light pattern method.

In an embodiment, the image sensor 221 and the depth sensor 227 may be separate or may be in the form of one sensor.

The detection unit 220 may include an acceleration sensor 223, a tilt sensor 225, a location sensor 222, and a gyroscope sensor 229 to detect the movement of the user. For example, the movement of the user may include a movement of the user of rotating the head, tilting the head, or moving the head up, down, left, and right while wearing the AR display 200.

The detection unit 220 may include a biological sensor 224, a proximity sensor 226, and an optical sensor 228 to detect whether the user wears the AR display device 200.

Meanwhile, the detection unit 220 may further include a temperature sensor, an illuminance sensor, a pressure sensor, an iris recognition sensor, etc. in addition to the sensors illustrated in FIG. 6.

The A/V input unit 230 is a configuration for inputting an audio signal and a video signal, and may include a camera 231 and a microphone 232.

The camera 231 may correspond to the camera 205 of FIG. 3. The camera 231 may obtain an external image in a gaze direction of the user. The still image or video obtained through the camera 231 may be processed through a separate image processing unit and transmitted to the AR generating device 100. According to an embodiment, two or more cameras 231 may be disposed.

The camera 231 may include a color camera, a depth camera, a thermal camera, an infrared (IR) camera, a stereo camera, a dynamic vision sensor (DVS) camera, and a 360 degree camera.

Meanwhile, the camera 231 may be used to recognize a user's gesture, and in this case, the camera 231 may function as the detection unit 220.

The microphone 232 may receive an external audio signal and process the received signal into electric voice data. The microphone 232 may use various noise cancellation algorithms for canceling noise generated during reception of the external audio signal.

The output unit 290 may include a display unit 291, an audio output unit 292 and a vibration motor 293.

The display unit 291 may correspond to the lens 203 of FIG. 3. The display unit 291 may display the AR object based on a data signal received from the AR generating device 100. In addition, the display unit 291 may change the shape of the AR object based on the updated data signal, or rotate, move, and scale the AR object.

The display unit 291 may be formed of a transparent or translucent material. Alternatively, the display unit 291 may be formed of a material capable of adjusting transparency.

The audio output unit 292 may output an audio signal related to a function (e.g., message reception sound, notification sound, etc.) performed in the AR display device 200. The sound output unit 292 may be configured in the form of an earphone that may be mounted on the user's ear. Alternatively, the sound output unit 292 may be configured in the form of a speaker.

The vibration motor 293 may output a vibration signal. For example, the vibration motor 293 may output the vibration signal corresponding to an audio signal or an image signal. In addition, when the input unit 280 is configured as a touch screen, the vibration motor 293 may output the vibration signal corresponding to a user touch input.

The memory 240 may store a program for controlling the AR display device 200. Further, the memory 240 may store identification information for identifying the user.

The memory 240 may include a storage medium of at least one type of a flash memory type, a hard disk type, a multimedia card micro type, a card type memory (e.g., a secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, or an optical disk.

The input unit 280 may receive a user input. The user input may include a command or request to initiate or end a certain function.

The input unit 280 may be configured as a key pad, a dome switch, a jog wheel, a jog switch, etc. Alternatively, the input unit 280 may be configured in the form of a touch pad. For example, the user touch input may include a tap, double tap, hold, swipe, panning, or flick.

In an embodiment, the AR display device 200 may receive a user gesture input, speech input, and in this case, the camera 231 and the microphone 232 may function as the input unit 280.

The interface unit 270 may support a designated protocol that may be connected to an external electronic device by wired or wirelessly. In an embodiment, the interface unit 270 may include a high definition multimedia interface (HDMI), a universal serial bus (USB) interface, an SD card interface, an audio interface, etc.

According to an embodiment, the interface unit 270 may be by wired connected to the interface unit 160 of FIG. 5 in the AR generating device 100. When the interface unit 270 is by wired connected to the interface unit 160 in the AR generating device 100, the AR display device 200 may transmit a detection signal to the AR generating device 100 through the interface unit 270.

The power management unit 261 may manage power supplied to the AR display device 200. For example, the power management unit 261 may include a power management integrated circuit (PMIC), a charger integrated circuit (IC), a battery or a fuel gauge, etc.

The battery 262 is a device for supplying power to at least one component of the AR display device 200, and, for example, may include a non-rechargeable primary battery, a rechargeable secondary battery, a fuel battery, etc.

The communication unit 251 may communicate with the AR generating device 100. To this end, the communication unit 251 may include a first communication module 251a and a second communication module 251b.

The first communication module 251a and the second communication module 251b may communicate with the AR generating device 100.

The first communication module 251a may communicate with the AR generating device 100 through a first frequency band or radio band. In an embodiment, the first communication module 251a may be a BLE communication module. Also, the first frequency band may be 2.4 GHz or 5.8 GHz. When the first communication module 251a is the BLE communication module, the AR display device 200 may perform low power communication with the AR generating device 100.

The second communication module 251b may communicate with the AR generating device 100 through a second frequency band. In an embodiment, the second communication module 251b may be a broadband communication module supporting ultra high speed communication and near field communication. Also, the second frequency band may be 60 GHz. When the second communication module 251b is the broadband communication module supporting 60 GHz communication, the AR display device 200 may transmit a large capacity file to the AR generating device 100. In addition, a data rate of the AR display device 200 may increase, and a latency may be reduced.

Meanwhile, the first communication module 251a and the second communication module 251b may be implemented as one chip or may be implemented as separate chips.

The antenna unit 252 may include a first band antenna 252a and a second band antenna 252b.

The first band antenna 252a may be connected to the first communication module 251a. The first band antenna 252a may transmit a first location notification signal to the AR generating device 100 through the first frequency band. Also, the first band antenna 252a may receive a second location notification signal from the AR generating device 100 through the first frequency band. The first location notification signal and the second location notification signal may be beacon signals. The beacon signals may serve to announce the presence of the AR display device 200, and may include location information (e.g., an Internet Protocol (IP) address, a media access control (MAC) address, a device ID) of the AR display device 200. When the first location notification signal is the beacon signal, the processor 210 may identify an ID of the second location notification signal. In an embodiment, the second location notification signal may include a universally unique identifier (UUID), and the processor 210 may identify the AR generating device 100 corresponding to the AR display device 200 and may determine a physical location of the AR display device 200, based on the UUID.

The second band antenna 252b may be connected to the second communication module 251b. The second band antenna 252b may receive a data signal from the AR generating device 100 through the second frequency band. Also, the second band antenna 252b may transmit a detection signal to the AR generating device 100 through the second frequency band.

The processor 210 may overall control the AR display device 200.

The processor 210 may activate the AR display device 200 based on user identification information stored in the memory 240.

The processor 210 may adjust the transparency of the display unit 291 according to an AR mode, a VR mode, or an MR mode.

The processor 210 may control the display unit 291 to display the AR object. In an embodiment, the processor 210 may correct the display location of the AR object based on a focal length of the user obtained by the image sensor 221.

Meanwhile, each of the components of FIG. 6 may be configured as one or the component, the name of the component may vary depending on the type of the AR display device 200. The AR display device 200 of the present disclosure may be configured to include at least one of the above-described components, and some components may be omitted or additional other components may be further included.

Figure 7:
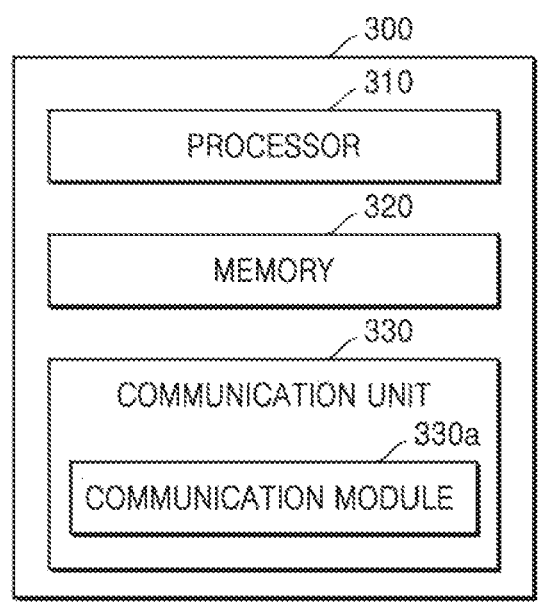
FIG. 7 is a block diagram of a server according to an embodiment.

FIG. 7 is a block diagram of the server 300 according to an embodiment.

Referring to FIG. 7, the server 300 may include a processor 310, a communication unit 330 and a memory 320.

The communication unit 330 may communicate with the AR generating device 100. To this end, the communication unit 330 may include a communication module 330a.

The communication module 330a may communicate with the AR generating device 100 through a third frequency band. In an embodiment, the communication module 330a may be a 5G communication module. Also, the third frequency band may be 3.5 GHz or 28 GHz.

The processor 310 controls the communication unit 330 to enable interaction between the plurality of AR generating devices 100-1 . . . 100-n.

Specifically, the processor 310 may control the communication unit 330 to transmit a first detection signal received from the first AR generating device 100-1 to the second AR generating device 100-2. In addition, the processor 310 may control the communication unit 330 to transmit a second detection signal received from the second AR generating device 100-2 to the first AR generating device 100-1.

The first AR generating device 100-1 may change the shape of a first AR object, or rotate, move, and scale the first AR object based on the second detection signal. Also, the second AR generating device 100-2 may change the shape of a second AR object, or rotate, move, and scale the second AR object based on the first detection signal. In other words, the shape, pattern, etc. of the AR object generated by any one of the plurality of AR generating devices 100-1 . . . 100-n may be changed by a detection signal provided from the other AR generating device.

The memory 320 may store identification information (for example, a product key) of the AR generating device 100 and the AR display device 200 connected to the AR generating device 100, user identification information (for example, user's voice, iris, retina, fingerprint, etc.), a voice recognition model for recognizing the user's voice input, update information, etc.

Meanwhile, the server 300 may be the server 300 operated by a manufacturer that manufactures the AR generating device 100 and the AR display device 200 or a service provider.

Figure 8:
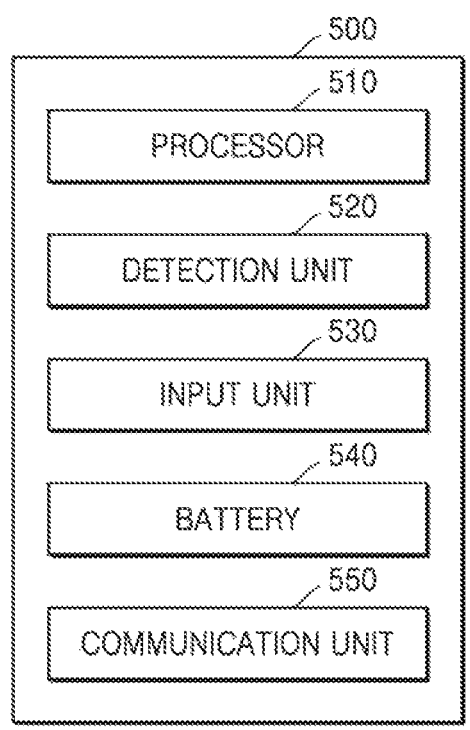
FIG. 8 is a block diagram of an input device according to an embodiment.

FIG. 8 is a block diagram of the input device 500 according to an embodiment.

Referring to FIG. 8, the input device 500 may include a processor 510, a detection unit 520, an input unit 530, a battery 540, and a communication unit 550.

The detection unit 520 may detect the state of a user wearing the input device 500, the movement of a user, etc. and output detection information as a detection signal. The detection signal output from the detection unit 520 may be transmitted to the AR display device 200 through the communication unit 550. To this end, the detection unit 520 may include at least one of an acceleration sensor, a tilt sensor, a positioning sensor, and a gyroscope sensor.

The input unit 530 may receive a user input. In an embodiment, the input unit 530 may be configured in the form of a touch pad. User input information received by the input unit 530 may be transmitted to the AR display device 200 through the communication unit 550.

The battery 540 may supply power to at least one component of the input device 500. In an embodiment, the input device 500 may further include a wireless charging module for wireless charging.

The communication unit 550 may communicate with the AR display device 200. The communication unit 550 may transmit a detection signal to the AR display device 200 and receive firmware update data from the AR display device 200.

The processor 510 may overall control the input device 500.

Figure 9:
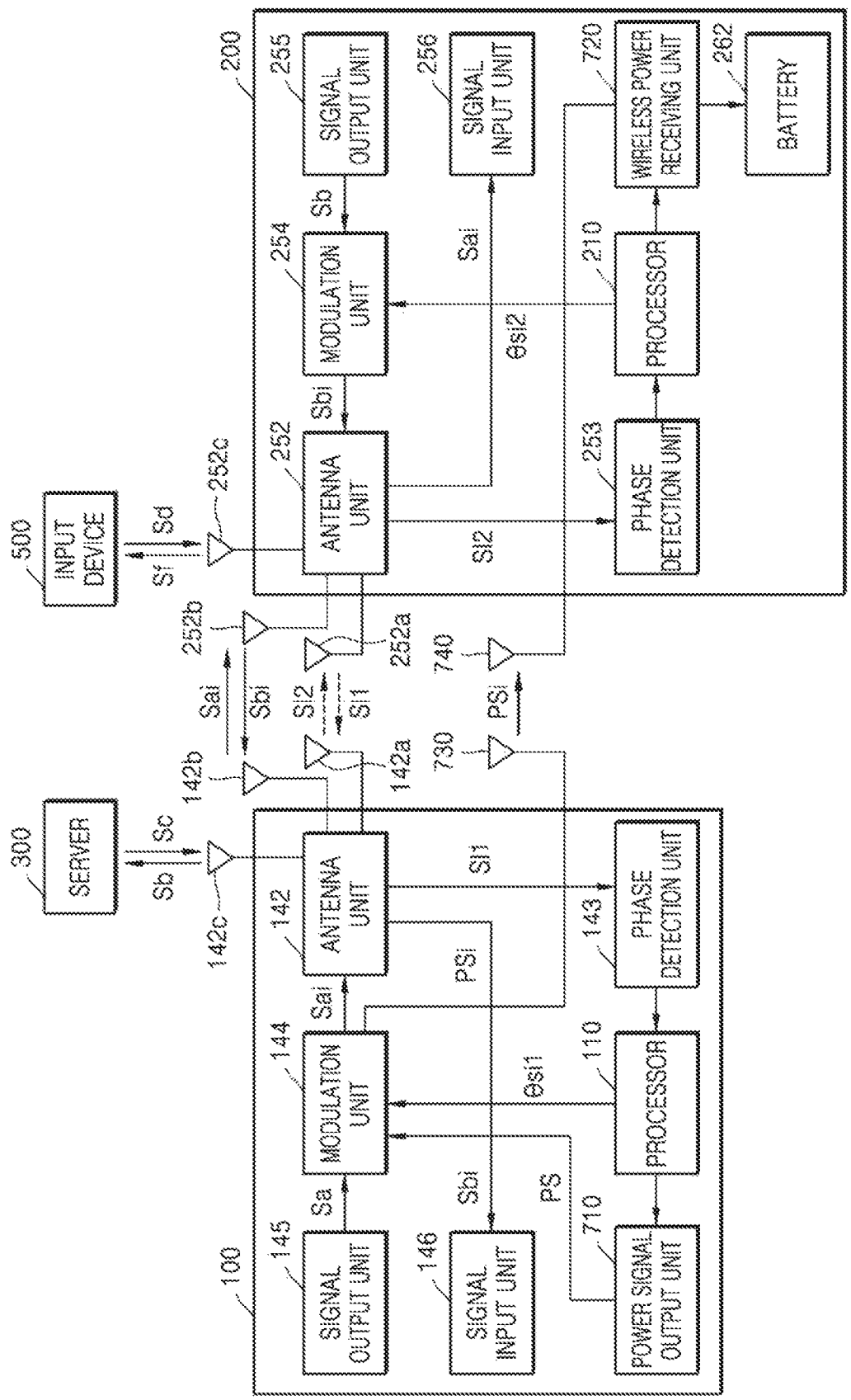
FIG. 9 is a block diagram of a server, an AR generating device, and an AR display device according to an embodiment.

FIG. 9 is a block diagram of a server, an AR generating device, and an AR display device according to an embodiment.

As described above, the AR system 10 of the present disclosure has a relatively complex and large volume configuration such as a rendering engine disposed in the AR generating device 100, and a relatively simple and small volume configuration such as a sensor disposed in the AR display device 200, in order to significantly increase the wearing comfort of the AR display device 200 and increase the user convenience. In this case, because a data signal transmitted from the AR generating device 100 to the AR display device 200 has a large capacity, the AR generating device 100 transmits the data signal using broadband communication for a fast response and a large capacity file transmission of the AR display device 200. For example, the AR generating device 100 may transmit the data signal through a 60 GHz band.

However, high frequency broadband communication may consume a large amount of power, and when the receiving end moves, the search time for searching a receiving end may increase. Accordingly, there is a problem that the latency of data transmission rather increases.

The AR system 10 of the present disclosure may receive a location notification signal through a low power first frequency band and may modulate an output signal based on the phase of the location notification signal, to increase data transmission rate and transmission efficiency. For example, the first frequency band may be 2.4 GHz or 5.8 GHz. Also, the location notification signal may be a beacon signal.

The AR generating device 100 may include a signal output unit (e.g., a signal output circuit) 145, an antenna unit (e.g., one or more antennas) 142, a phase detection unit (e.g., a phase detector) 143, a modulation unit 144 (e.g., a modulator), a signal input unit 146, and the processor 110 to increase the data transmission rate and transmission efficiency.

The signal output unit 145 may output a data signal Sa including information about the AR object. The data signal Sa may be generated by the processor 110 as an image signal or a video signal of the AR object registered in a rendered 3D space. For example, the data signal Sa may be an alternating current (AC) signal having a constant amplitude and phase. The data signal Sa may be input to the modulation unit 144.

The modulation unit 144 may modulate the phase of the data signal Sa. The modulation unit 144 may modulate the phase of the data signal Sa under the control of the processor 110. According to an embodiment, the modulation unit 144 may modulate the amplitude of the data signal Sa. The modulation unit 144 may modulate the amplitude of the data signal Sa under the control of the processor 110.

Specifically, the antenna unit 142 may include a first band antenna 142a, a second band antenna 142b, and a third band antenna 142c.

The first band antenna 142a may receive the location notification signal S1 for modulating the data signal Sa from the AR display device 200 through the first frequency band. For example, the first frequency band may be 2.4 GHz or 5.8 GHz.

The first band antenna 142a may provide the location notification signal S1 to the phase detection unit 143.

The phase detection unit 143 may detect the phase of the location notification signal S11. The phase detection unit 143 may provide the phase of the detected location notification signal S1 to the processor 110.

The processor 110 may calculate a time-reversed phase of the location notification signal S1 by performing time reversal signal processing on the location notification signal S1. For example, the modulation unit 144 may complex-conjugate the wave of the location notification signal sI1 to calculate the time-reversed phase of the location notification signal SI1. Alternatively, the modulation unit 144 may invert the wave of the location notification signal SI1 by $\pi/2$ to calculate the time-reversed phase of the location notification signal SI1.

The processor 110 may calculate the time-reversed phase $\theta si1$ of the data signal Sa by multiplying the time-reversed phase of the location notification signal S1 by a preset factor.

The preset factor may be set to a value obtained by dividing a frequency value of the second frequency band, which is the frequency band of the data signal Sa, by a frequency value of the first frequency band. For example, when the second frequency band is 60 GHz and the first frequency band is 2.4 GHz, the factor may be set to 25. The reason for calculating the time-reversed phase $\theta si1$ of the data signal Sa by multiplying the time-reversed phase of the location notification signal S1 by the preset factor is that because a frequency band of the location notification signal S1 and a frequency band of the data signal Sa are different, it is necessary to scale the time-reversed phase $\theta si1$ of the data signal Sa to correspond to the frequency band of the data signal Sa for accurate transmission of the data signal Sa.

The processor 110 may provide the time-reversed phase $\theta si1$ of the data signal Sa to the modulation unit 144.

The modulation unit 144 may modulate the phase of the data signal Sa to have the time-reversed phase $\theta si1$ based on the time-reversed phase $\theta si1$. The modulation unit 144 may provide a time-reversed data signal Sai to the antenna unit 142.

The second band antenna 142b may transmit the time-reversed data signal Sai to the AR display device 200 through the second frequency band. For example, the second frequency band may be 60 GHz.

Meanwhile, unlike the data signal Sa including image information or video information, the data signal Sa including audio information or text information may be transmitted to the AR labeling device 200 through the first frequency band. When the data signal Sa including the audio information or the text information is transmitted through the first frequency band, robust communication is possible.

The time-reversed data signal Sai may be input to the signal input unit 256 provided in the AR display device 200. In FIG. 9, the signal input unit 256 is a separate configuration from the processor 210, but according to an embodiment, the signal input unit 256 may be a part of the processor 210. The processor 210 may control the display unit 291 based on the time-reversed data signal Sai. The processor 210 may display the AR object on the display unit 291 based on the time-reversed data signal Sai.

As described above, when the AR generating device 100 time-reverses data signals based on the time-reversed phase of the location notification signal and transmits the time-reversed data signals, constructive interference occurs where the phase of the data signals are in-phase in the location of the AR display device 200. Therefore, data transmission efficiency may significantly increase. In addition, as data transmission efficiency increases, power consumption of the AR generating device 100 may be reduced. In addition, because the AR generating device 100 may accurately transmit the data signal to the location of the AR display device 200, the latency of data transmission may be reduced.

Meanwhile, in order to implement a multi-user system, the AR generating device 100 may communicate with the server 300. At this time, when using a first frequency band capable of low power communication, inefficiency due to a slow response speed is a problem. In addition, the second frequency band capable of high frequency broadband communication has a limitation in constructing the multi-user system due to lack of channels.

Accordingly, the AR generating device 100 of the present disclosure may communicate with the server 300 through a third frequency band different from the first frequency band and the second frequency band.

Specifically, the third band antenna 142c may transmit a detection signal Sb received from the AR display device 200 to the server 300 through the third frequency band. Also, the third band antenna 142c may receive a detection signal Sc from the server 300. For example, the third band antenna 142c may transmit the first detection signal Sb received from the first AR display device 200-1 to the server 300 through the third frequency band, and the second detection signal Sc transmitted by the AR display device 200-2 may be received from the server 300. At this time, the third frequency band may be a 5G communication band. For example, the third frequency band may be 3.5 GHz or 28 GHz.

The processor 110 may change the shape, pattern, etc. of the AR object based on the second detection signal Sc. Accordingly, the AR system 10 of the present disclosure enables interaction between the plurality of AR display devices 200-1 . . . 200-n.

Meanwhile, the AR display device 200 may include a signal output unit 255, an antenna unit 252, a phase detection unit 253, a modulation unit 254, a signal input unit 256, and the processor 210 to increase the transmission rate and transmission efficiency of the detection signal. Meanwhile, in order to distinguish between the components included in the AR generating device 100 and the components included in the AR display device 200, the former may be named as the first signal output unit 145, the first antenna unit 142, the first phase detection unit 143, the first modulation unit 144, the first signal input unit 146 and the first processor 210, and the latter may be named as the second signal output unit 255, the second antenna unit 252, the second phase detection unit 253, the second modulation unit 254, the second signal input unit 256 and the second processor 210.

The signal output unit 255 may detect information for generating the AR object and output the detection signal Sb. For example, the signal output unit 255 may output motion information of a user, gaze information, focus information, ambient temperature of a device, and inertia information as the detection signal Sb. The detection signal Sb may be an AC signal having a constant amplitude and phase. The detection signal Sb may be input to the modulation unit 254.

According to an embodiment, the detection signal Sd may be provided by the input device 500. For example, the input device 500 may provide the AR display device 200 with the ambient temperature of the device, inertial information, etc. as a detection signal Sd. To this end, the AR display device 200 may further include a third band antenna 252c.

The third band antenna 252c may receive the detection signal Sd from the input device 500 through the first frequency band. For example, the first frequency band may be 2.4 GHz or 5.8 GHz.

To prevent confusion between a location notification signal SI2 which will be described later and the detection signal Sd, the processor 210 may set the use band of the location notification signal SI2 and the use band of the detection signal Sd different from each other. For example, when the use band of the location notification signal SI2 is 2.4 GHz, the use band of the detection signal Sd may be set to 5.8 GHz. Conversely, when the use band of the location notification signal SI2 is 5.8 GHz, the use band of the detection signal Sd may be set to 2.4 GHz.

Hereinafter, for convenience of description, description will be made based on the detection signal Sb, but the following description may also be applied to the detection signal Sd.

The modulation unit 254 may modulate the phase of the detection signal Sb. The modulation unit 254 may modulate the phase of the detection signal Sb under the control of the processor 210.

Specifically, the antenna unit 252 may include a first band antenna 252a and a second band antenna 252b.

The first band antenna 252a may receive the location notification signal SI2 for modulating the detection signal Sb from the AR generating device 100 through the first frequency band. For example, the first frequency band may be 2.4 GHz or 5.8 GHz.

The first band antenna 252a may provide the location notification signal SI2 to the phase detection unit 253.

The phase detection unit 253 may detect the phase of the location notification signal SI2. The phase detection unit 253 may provide the phase of the detected location notification signal SI2 to the processor 210.

The processor 210 may calculate a time-reversed phase of the location notification signal SI2. For example, the modulation unit 254 may complex-conjugate the wave of the location notification signal sI2 to calculate the time-reversed phase of the location notification signal SI2. Alternatively, the modulation unit 254 may invert the wave of the location notification signal SI2 by $\pi/2$ to calculate the time-reversed phase of the location notification signal SI2.

The processor 210 may calculate the time-reversed phase $\theta si2$ of the detection signal Sb by multiplying the time-reversed phase of the location notification signal SI2 by a preset factor.

The preset factor may be set to a value obtained by dividing the frequency value of the second frequency band, which is the frequency band of the detection signal Sb, by the frequency value of the first frequency band. For example, when the second frequency band is 60 GHz and the first frequency band is 2.4 GHz, the preset factor may be 25. The reason for calculating the time-reversed phase $\theta si2$ of the detection signal Sb by multiplying the time-reversed phase of the location notification signal SI2 by the preset factor is that because a frequency band of the location notification signal SI2 and a frequency band of the detection signal Sb are different, it is necessary to scale the time-reversed phase $\theta si2$ of the detection signal Sb to correspond to the frequency band of the detection signal Sb for accurate transmission of the detection signal Sb.

The processor 210 may provide the time-reversed phase $\theta si2$ of the detection signal Sb to the modulation unit 254.

The modulation unit 254 may modulate the phase of the detection signal Sb to have the time-reversed phase $\theta si2$ based on a time-reversed phase $\theta si3$. The modulation unit 254 may provide a time-reversed data signal Sai2 to the antenna unit 252.

The second band antenna 252b may transmit a time-reversed data signal Sbi to the AR generating device 100 through the second frequency band. For example, the second frequency band may be 60 GHz.

Meanwhile, because the file size of the detection signal Sb is smaller than the file size of the data signal Sa, in the second frequency band, a bandwidth allocated to the time-reversed detection signal Sbi may be set to be smaller than the bandwidth allocated to the time-reversed data signal Sai.

The time-reversed data signal Sbi may be input to the signal input unit 146 provided in the AR generating device 100. In FIG. 9, the signal input unit 146 is a separate configuration from the processor 110, but according to an embodiment, the signal input unit 146 may be a part of the processor 110. The processor 110 may generate the AR object based on the time-reversed data signal Sbi.

As described above, when the AR display device 200 time-reverses data signals based on the time-reversed phase of the location notification signal and transmits the time-reversed data signals, constructive interference occurs where the phase of the data signals are in-phase in the location of the AR generating device 100. Therefore, data transmission efficiency may significantly increase. In addition, as data transmission efficiency increases, power consumption of the AR display device 200 may be reduced. In addition, because the AR display device 200 may accurately transmit the data signal to the location of the AR generating device 100, the latency of data transmission may be reduced.

Meanwhile, when the AR display device 200 is charged by the wireless power supplied from the AR generating device 100, the AR generating device 100 may further include a power signal output unit 710 for wireless power transmission. In addition, the AR display device 200 may further include a wireless power receiving unit 262 for receiving wireless power.

The power signal output unit 710 may output a power signal PS. The power signal PS may be an AC signal having a constant amplitude and phase. The power signal PS may transmit electromagnetic waves in various frequency ranges. For example, the power signal PS may transmit electromagnetic waves including a radio frequency or a microwave frequency range.

The AR generating device 100 may analyze the location notification signal S1, and modulate the power signal PS based on a result of analysis to increase the transmission efficiency of wireless power.

Specifically, the power signal output unit 710 may output the power signal PS to the modulation unit 144. The modulation unit 144 may modulate the phase of the power signal PS based on the time-reversed phase of the location notification signal S1. The modulation unit 144 may modulate the phase of the power signal PS to have the time-reversed phase of the location notification signal S1. A time-reversed power signal PSi may be provided to the power transmission antenna 730. The power transmission antenna 730 may output the time-reversed power signal PSi. The power transmission antenna 730 may transmit the time-reversed power signal PSi non-directionally.

The AR display device 200 may receive the time-reversed power signal PSi through the power receiving antenna 740. The time-reversed power signal PSi may be provided to the wireless power receiving unit 720. The wireless power receiving unit 720 may rectify the time-reversed power signal PSi. Also, the wireless power receiving unit 720 may charge the battery 262 using the rectified power signal.

Figure 10:
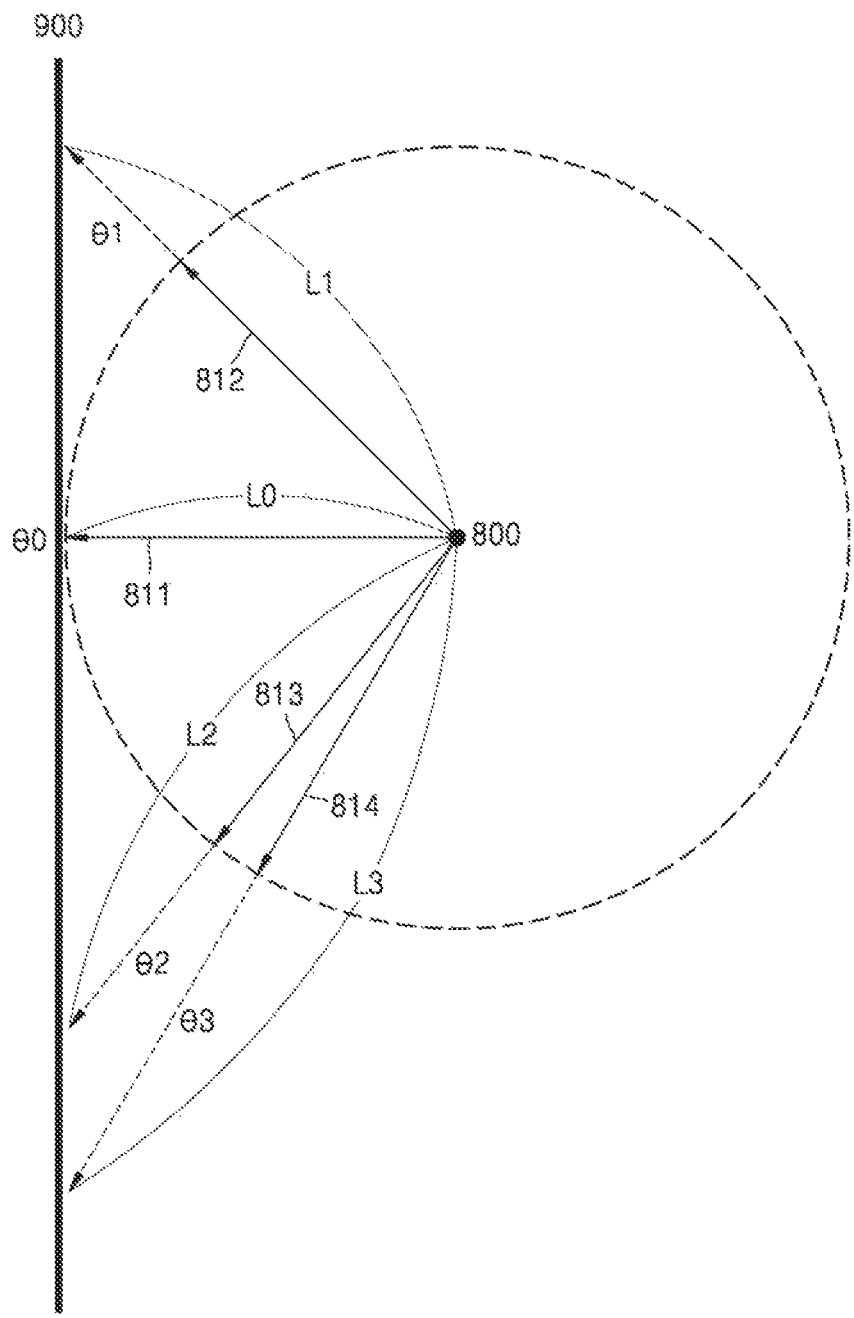
FIG. 10 is a diagram illustrating a phase difference of location notification signals received by a plurality of antennas according to an embodiment.
Figure 11:
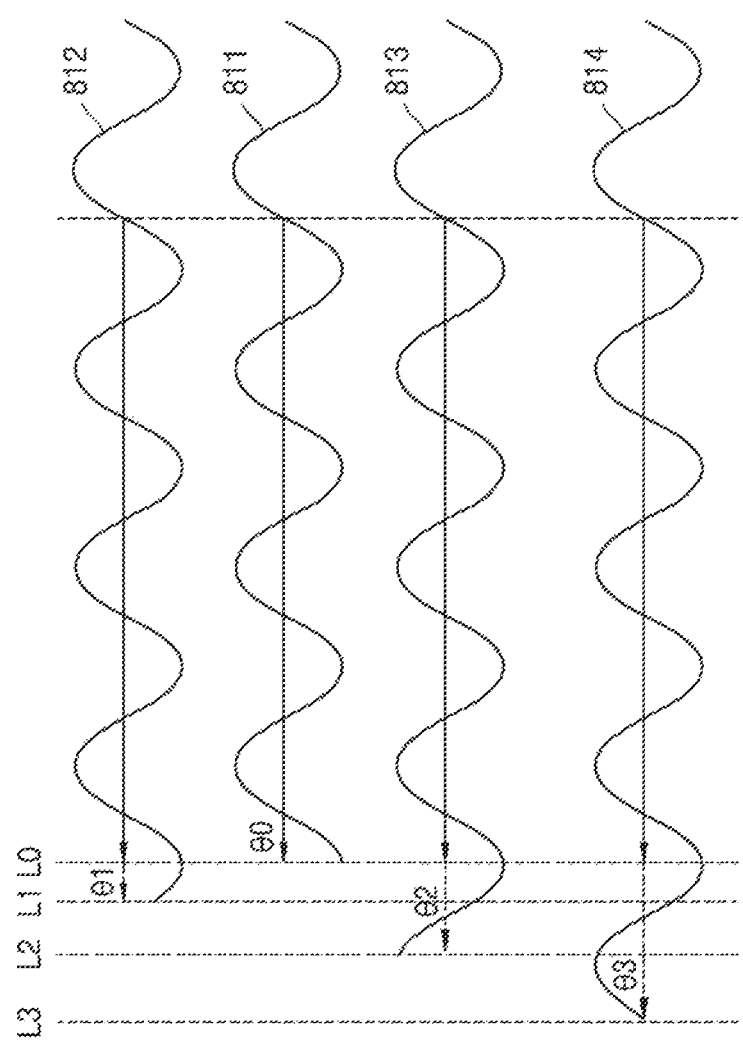
FIG. 11 is a diagram illustrating a phase difference of location notification signals received by a plurality of antennas according to an embodiment.

FIGS. 10 to 11 are diagrams illustrating a phase difference of location notification signals received by a plurality of antennas according to an embodiment.

Referring to FIG. 10, in FIG. 10, a transmitting device 800 may output at least one location notification signal. Also, a receiving device 900 may receive the location notification signal output by the transmitting device 800.

When the AR generating device 100 outputs the location notification signal, and the AR display device 200 receives the location notification signal, the transmitting device 800 of FIG. 10 may correspond to the AR generating device 100, and the receiving device 900 may correspond to the AR display device 200. Conversely, when the AR display device 200 outputs the location notification signal, and the AR generating device 100 receives the location notification signal, the transmitting device 800 of FIG. 10 may correspond to the AR display device 200, and the receiving device 900 may correspond to the AR generating device 100.

The transmitting device 800 may output the at least one location notification signal non-directionally. For example, the transmitting device 800 may output first to fourth location notification signals 811, 812, 813, and 814.

The receiving device 900 may receive at least one location notification signal output by the transmitting device 800. For example, the receiving device 900 may receive a first location notification signal 811 through a first path, a second location notification signal 812 through a second path, a third location notification signal 813 through a third path, and a fourth location notification signal 814 through a fourth path.

Because the transmitting device 800 outputs the location notification signal non-directionally, when the receiving device 900 receives a plurality of location notification signals, a difference in a reaching distance may occur between the plurality of location notification signals having different paths. Because the location notification signal is an AC signal having a constant amplitude and phase, the difference in the reaching distance between the plurality of location notification signals may be expressed as a phase.

FIG. 11 shows a phase difference between location notification signals according to the difference in the reaching distance.

In FIG. 11, the distance difference between the first location notification signal 811 and the second location notification signal 812 may be a first distance L1, and the phase difference with respect to the first distance L1 may be a first phase 81. In addition, the distance difference between the first location notification signal 811 and the second location notification signal 813 may be a second distance L2, and the phase difference with respect to the second distance L2 may be a second phase 82. In addition, the distance difference between the first location notification signal 811 and the fourth location notification signal 814 may be a third distance L3, and the phase difference with respect to the third distance L3 may be a third phase 83.

The receiving device 900 may calculate a time-reversed phase of the location notification signal.

Figure 12:
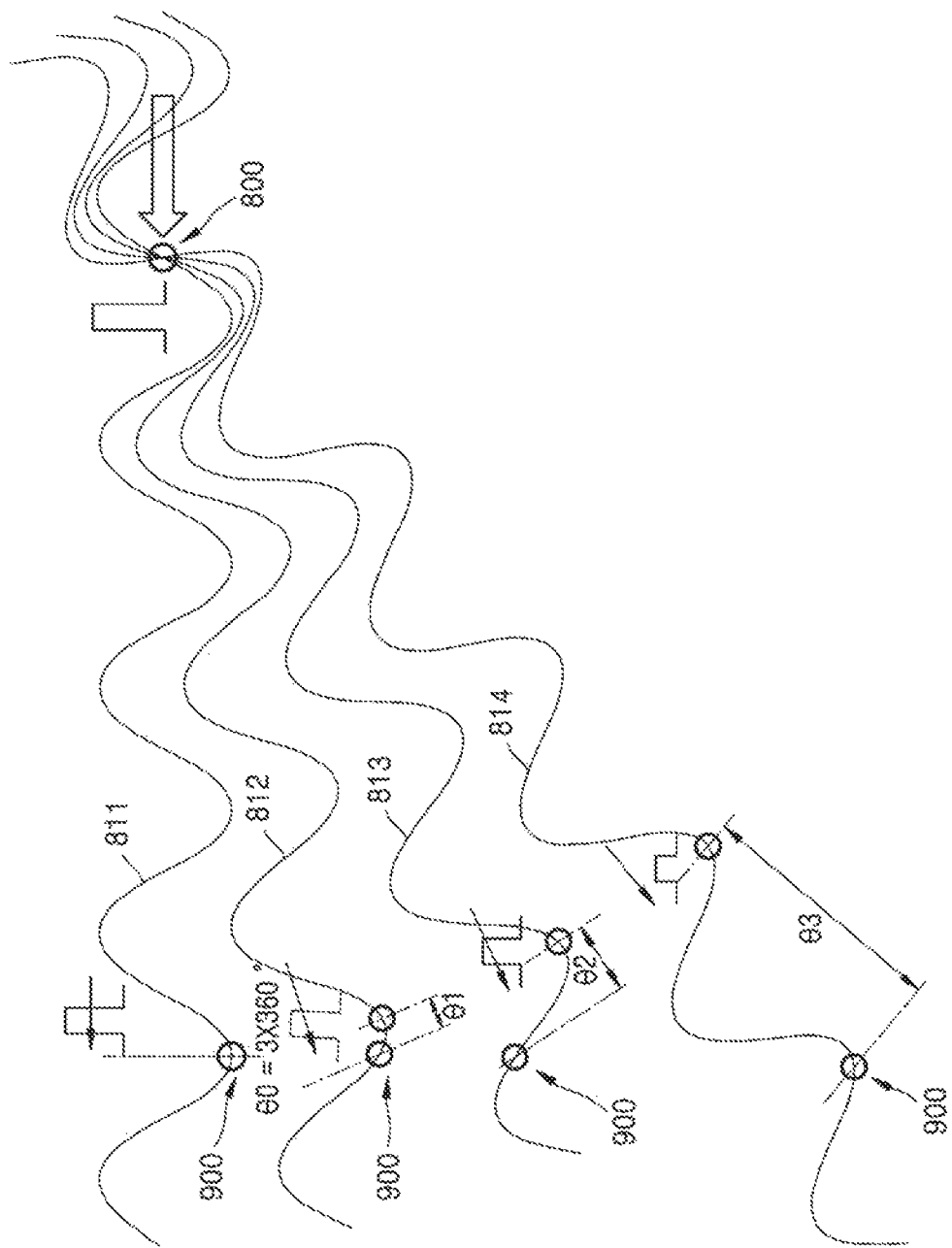
FIG. 12 is a diagram illustrating time-reversed signals transmitted from a plurality of antennas according to an embodiment
Figure 13:
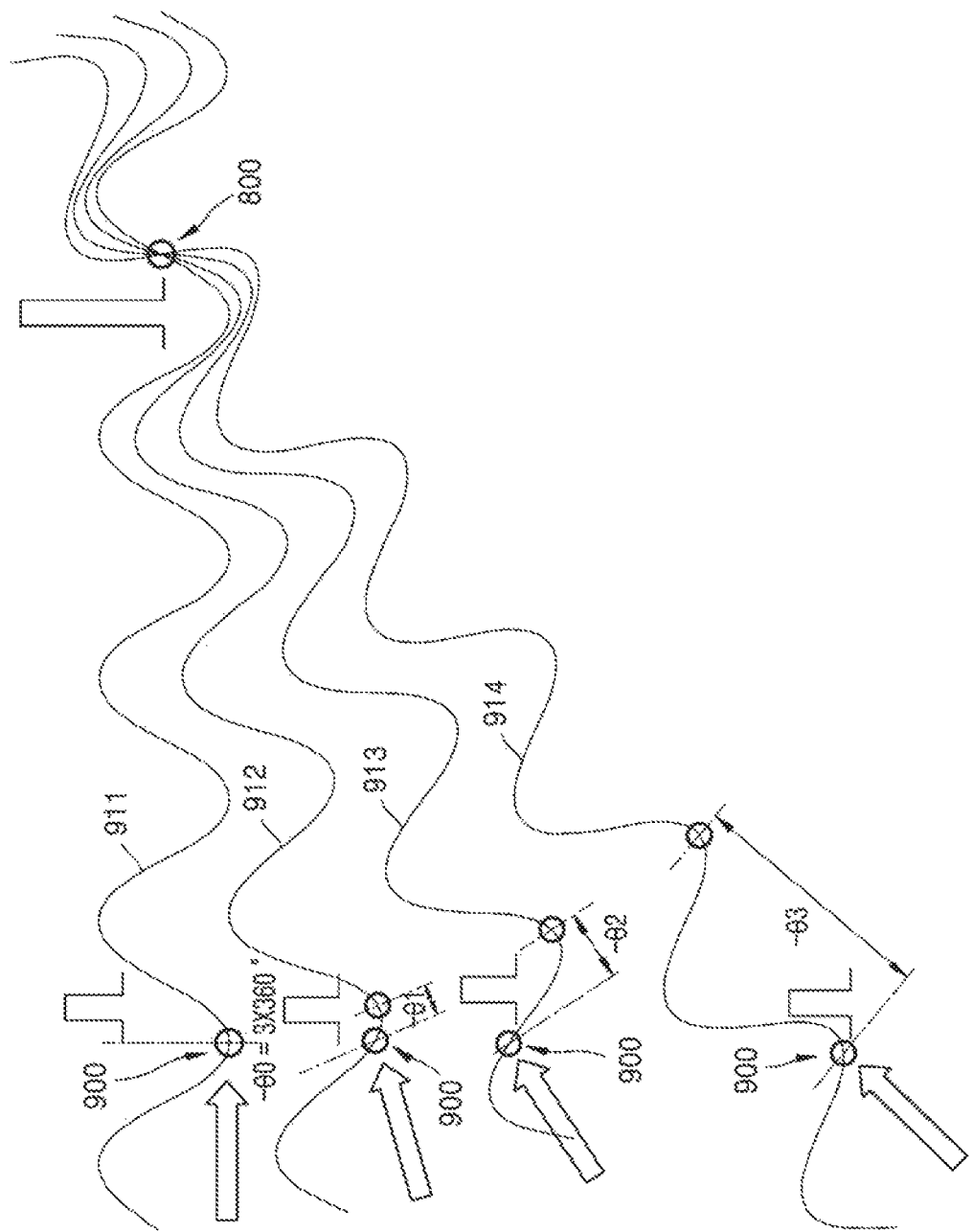
FIG. 13 is a diagram illustrating time-reversed signals transmitted from a plurality of antennas according to an embodiment

FIGS. 12 to 13 are diagrams illustrating time-reversed signals transmitted from a plurality of antennas according to an embodiment.

More specifically, FIG. 12 is a diagram illustrating a phase difference according to the reaching distance of location notification signals output from the transmitting device 800, and FIG. 13 is a diagram illustrating the effect of constructive interference when the receiving device 900 outputs a signal based on a time-reversed phase of the location notification signal.

Referring to FIG. 12, as illustrated in FIG. 12, reaching distances of the location notification signals 811, 812, 813, and 814 output from the transmitting device 800 may be different from each other. As the reaching distance increases, the intensity of the location notification signal received by the receiving device 900 may be reduced. In addition, a phase difference may occur between the location notification signals 811, 812, 813, and 814 received by the reception device 900 according to the reaching distance of the location notification signal.

As illustrated in FIG. 13, the receiving device 900 may complex-conjugate the wave of the location notification signal to calculate the time-reversed phase of the location notification signal.

The receiving device 900 may modulate data signals 911, 912, 913, and 914 or detection signals 911, 912, 913, and 914 such that the phase of the data signals 911, 912, 913, and 914 or the detection signals 911, 912, 913, and 914 to be transmitted to the transmitting device 800 is the time-reversed phase of the location notification signal.

When the receiving device 900 modulates the data signals 911, 912, 913, and 914 or the detection signals 911, 912, 913, and 914 based on the time-reversed phase of the location notification signal, constructive interference may occur where the phase of the data signals is in-phase in the location of the transmitting device 800. In other words, when the receiving device 900 modulates the data signals 911, 912, 913, and 914 or the detection signals 911, 912, 913, and 914 based on the time-reversed phase of the location notification signal, power may concentrate in the location of the transmitting device 800. Concentration of power in the location of the transmitting device 800 has an effect of increasing transmission efficiency.

FIG. 14 is a diagram illustrating a method of receiving a none line of sight (NLOS) signal according to an embodiment.

More specifically, FIG. 14 is a diagram illustrating a method of outputting a retrodirective data signal or a detection signal of the receiving device 900 with respect to output of a non-directional location notification signal of the transmitting device 800.

Referring to FIG. 14, the transmitting device 800 may output a location notification signal non-directionally. Accordingly, the location notification signal may be transmitted directly along an LOS path between the transmitting device 800 and the receiving device 900, or may be reflected, diffracted, and refracted along an NLOS path, and transmitted indirectly.

The receiving device 900 may output a data signal or a detection signal in a retrodirective way. In other words, the receiving device 900 may modulate the data signal or the detection signal such that the phase of the data signal or the detection signal is the time-reversed phase of the location notification signal, and may output the modulated data signal or detection signal in a retrodirective way. When the receiving device 900 outputs the data signal or the detection signal in a retrodirective way, even when the transmitting device 800 is present on the NLOS path, the receiving device 900 may accurately transmit the data signal or the detection signal to the transmitting device 800. In addition, because a retrodirective method has a fast operation speed, even when the transmitting device 800 moves at a high speed, the receiving device 900 may quickly track the transmitting device 800.

Figure 15:
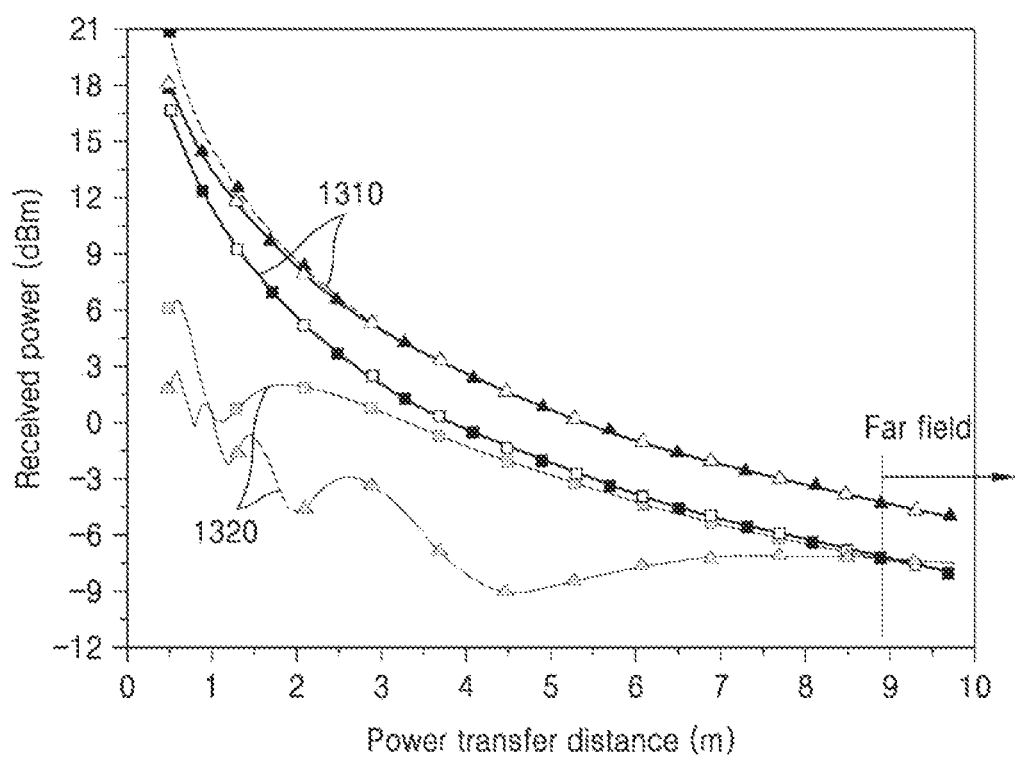
FIG. 15 is a diagram illustrating power comparison with regard to a reception integrated signal according to the distance between a beamforming method of the related art and a time-reversal method according to an embodiment.

FIG. 15 is a diagram illustrating comparison of the power of a reception integrated signal according to the distance between a beamforming method of the related art and a time-reversal method of the present disclosure.

FIG. 15 illustrates a first graph 1310 showing a change in reception power according to a transmission distance when a data signal or a detection signal is transmitted using the beamforming method of the related art, and a second graph 1320 showing a change in reception power according to a transmission distance when a data signal or a detection signal is transmitted using the time-reversal method of the present disclosure.

Referring to FIG. 15, as shown in FIG. 15, it may be seen that the reception power is greater in the time-reversal method than in the beamforming method of the related art at a preset distance (e.g., 9 m) or less. In other words, it may be seen that power concentrating on the transmitting device 800 of the time-reversal method is superior to that of the beamforming method of the related art. Because the concentration of power is related to the transmission efficiency, the present disclosure may provide the AR system 10 with excellent data transmission efficiency.

Meanwhile, in FIG. 15, it may be seen that the reception power of the time-reversal method and the beamforming method of the related art are similar at a preset distance (e.g., 9 m) or more. However, because the AR generating device 100 of the present disclosure is portable and is any one of devices in near field communication with the AR display device 200, such a comparison of reception power in a remote distance region is unnecessary.

Figure 16A:
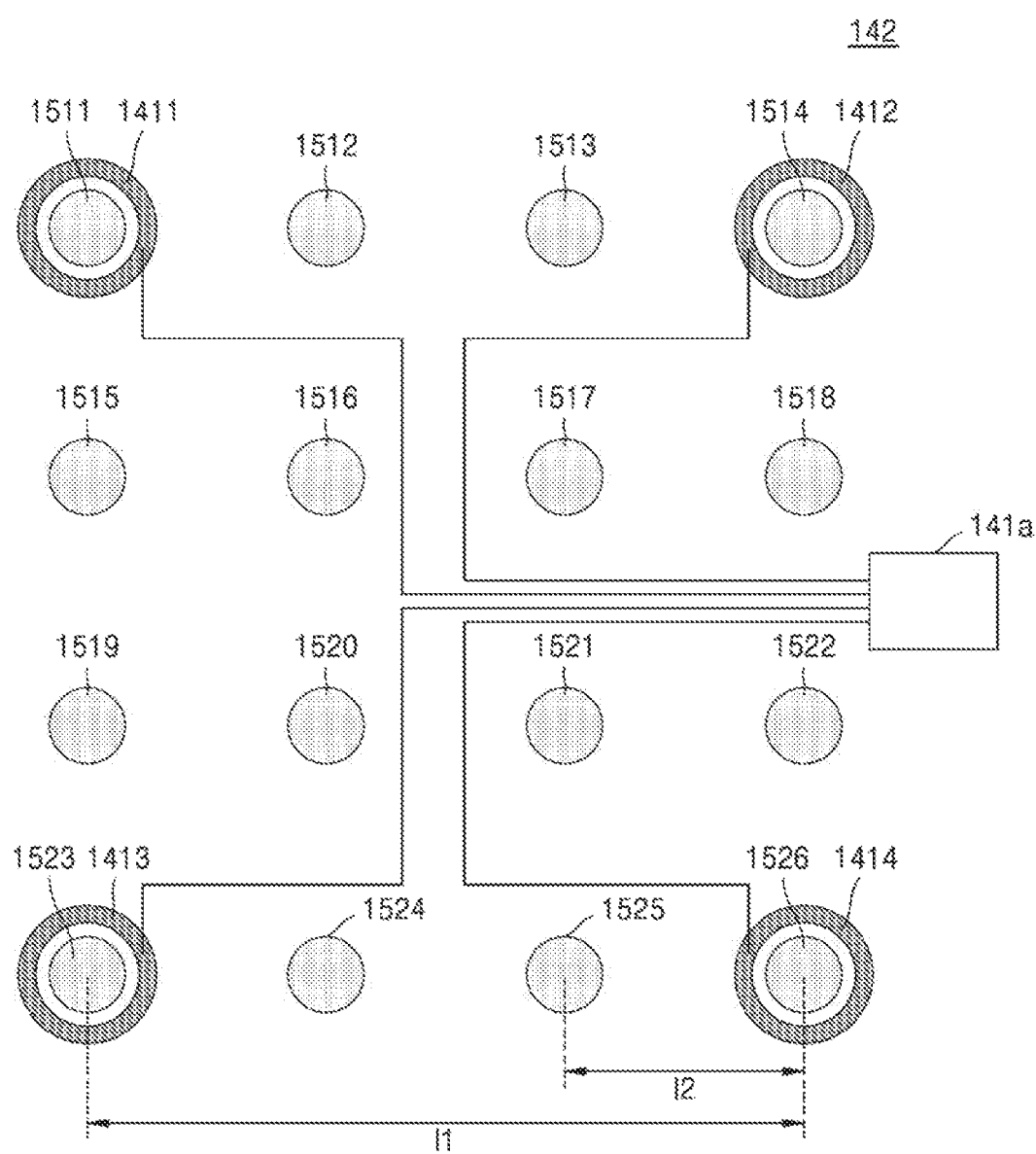
FIG. 16A is a plan view of an antenna unit included in an AR generating device according to an embodiment.
Figure 16B:
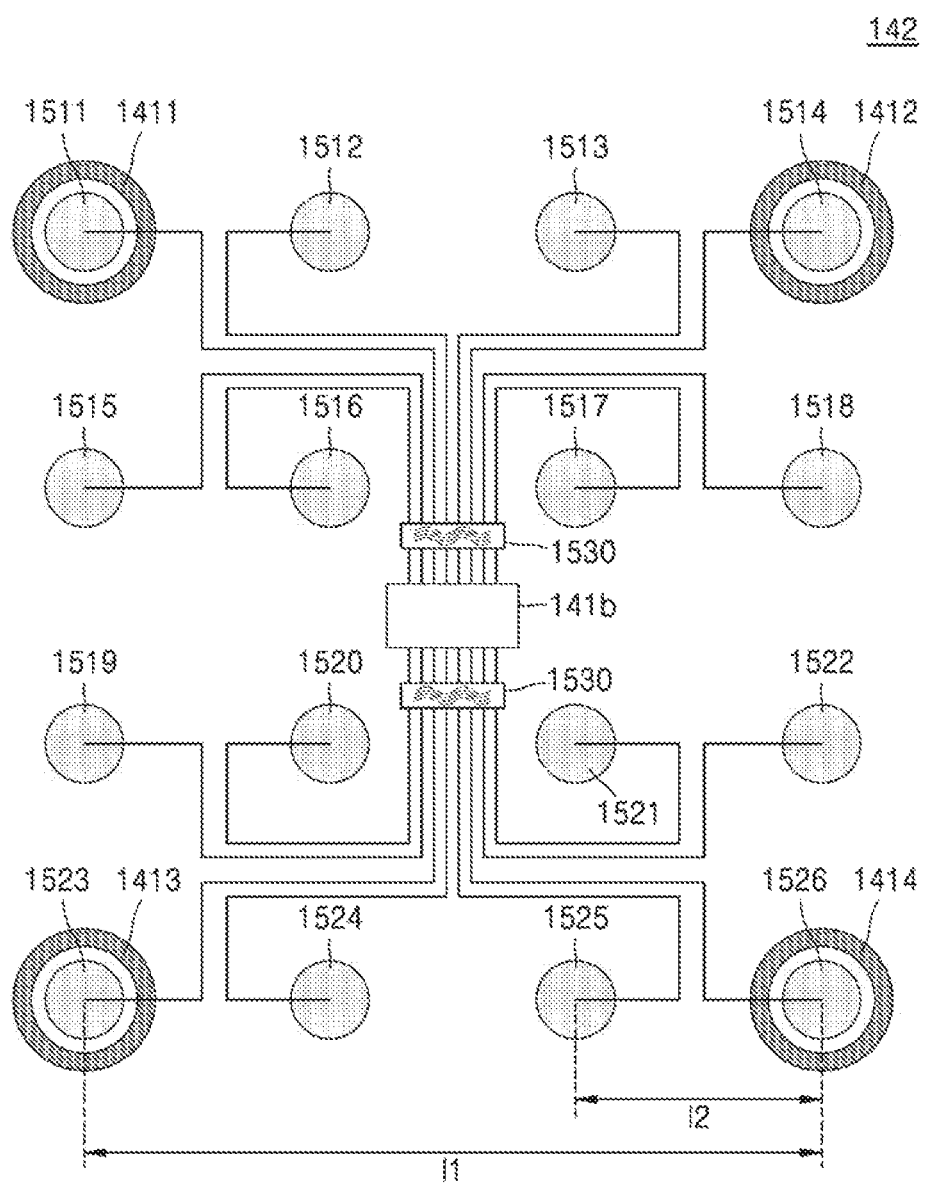
FIG. 16B is a plan view of an antenna unit included in an AR generating device according to an embodiment.

FIGS. 16A to 16B are plan views of an antenna unit 142 included in the AR generating device 100 according to an embodiment.

Referring to FIGS. 16A to 16B, the antenna unit 142 included in the AR generating device 100 may include first band antennas 1411 to 1414 (hereinafter referred to as 142a when there is no need to distinguish) and second band antennas 1511 to 1526 (hereinafter referred to as 142b when there is no need to distinguish).

The first band antennas 142a may receive a location notification signal output by the AR display device 200 and output the location notification signal generated therein to the AR display device 200. The second band antennas 142b may receive a time-reversed detection signal from the AR display device 200 and transmit a time-reversed data signal to the AR display device 200.

The first band antennas 142a may be arranged in the form of a matrix of 2 rows and 2 columns. The second band antennas 142b may be arranged in the form of a matrix of 4 rows and 4 columns. For transmission of a large capacity file such as a data signal, the number of the second band antennas 142b may be greater than the number of the first band antennas 142a. A distance 12 between the second band antennas 142b may be smaller than a distance 11 between the first band antennas 142a for improving reception efficiency and circuit integration.

The first band antennas 142a may have a ring shape. FIGS. 16A to 16B illustrate that the first band antennas 142a have a circular ring shape, but the present disclosure is not limited thereto. In other words, the first band antennas 142a may have an elliptical ring or polygonal ring shape.

The shape of the second band antennas 142b may be circular, but is not limited thereto. In other words, the shape of the second band antennas 142b may be oval or polygonal.

At least one second band antenna 1511, 1514, 1523, or 1526 of the second band antennas 1511 to 1526 may be disposed inside any one of the first band antennas 1411 to 1414.

Specifically, when the shapes of the first band antennas 142a are circular rings and the shapes of the second band antennas 142b are circular, the inner diameters of the first band antennas 142a may be larger than the outer diameters of the second band antennas 142b. Further, at least one second band antenna 1511, 1514, 1523, or 1526 of the second band antennas 1511 to 1526 may be disposed inside the first band antennas 1411 to 1414, and spaced apart from the first band antennas 1411 to 1414. As the second band antennas 1511, 1514, 1523, and 1526 disposed inside the first band antennas 1411 to 1414 are spaced apart from the first band antennas 1411 to 1414, interference between reception signals may be eliminated.

Each of the first band antennas 142a may be electrically connected to the first communication module 141a by a conducting wire. Each of the second band antennas 142b may be electrically connected to the second communication module 141b by the conducting wire.

Meanwhile, because the second band antennas 142b communicate in both directions, a band filter 1530 may be disposed between the second band antennas 142b and the second communication module 141b. According to an embodiment, the band filter 1530 may be disposed inside the second communication module 141b.

Figure 17:
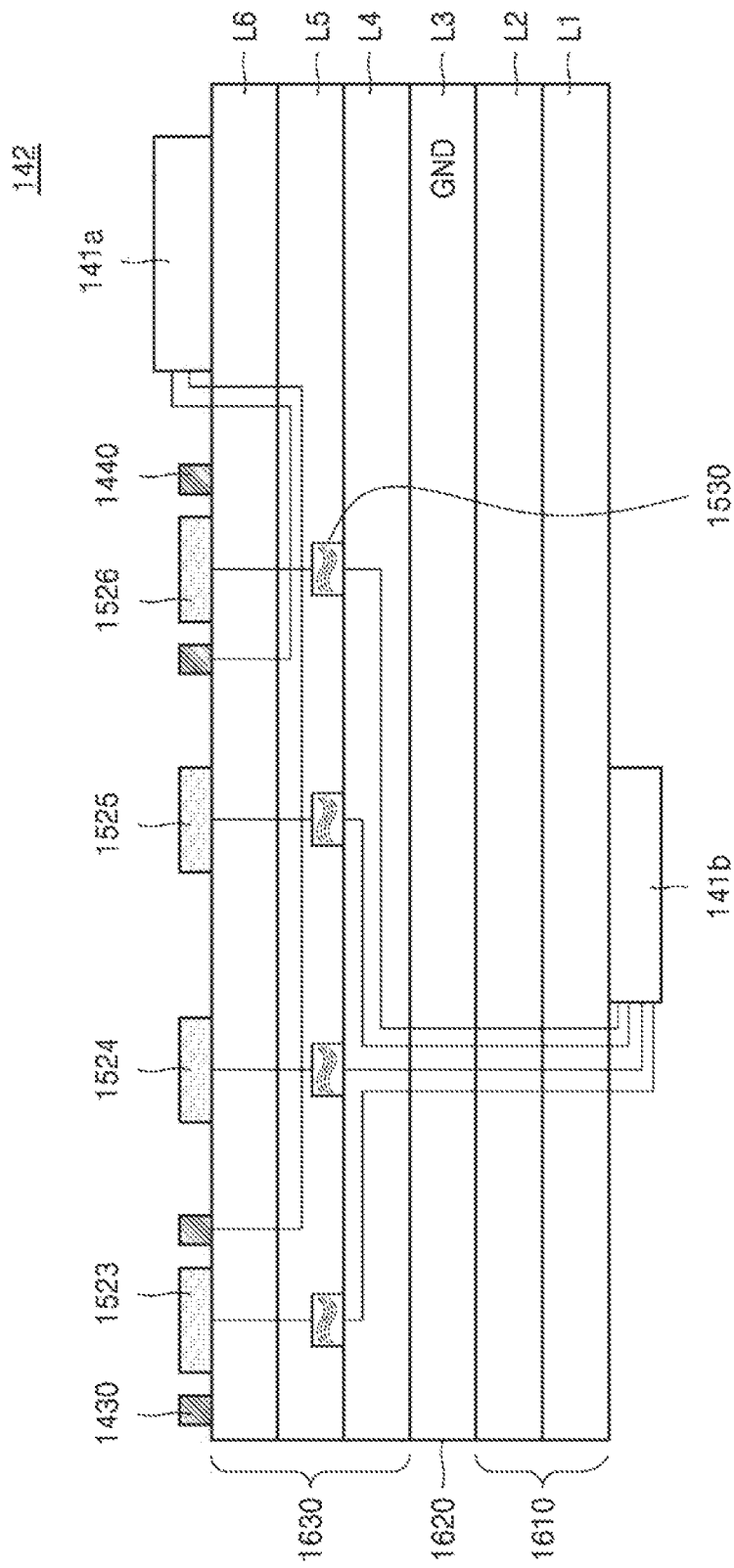
FIG. 17 is a cross-sectional view of an antenna unit included in an AR generating device according to an embodiment.

FIG. 17 is a cross-sectional view of the antenna unit 142 included in the AR generating device 100 according to an embodiment.

Referring to FIG. 17, the antenna unit 142 included in the AR generating device 100 may include a first substrate 1610, a second substrate 1620, and a third substrate 1630.

The second substrate 1620 may be disposed on an upper surface of the first substrate 1610, and the third substrate 1630 may be disposed on an upper surface of the second substrate 1620. Accordingly, first to sixth layers L1 to L6 may be formed in the antenna unit 142.

The first band antennas 142a, the second band antennas 142b, and the first communication module 141a may be disposed on an upper surface of the third substrate 1630. According to an embodiment, the first communication module 141a may be disposed on the lower surface of the first substrate 1610. The third substrate 1630 may be formed as a low loss printed circuit board (PCB) to reduce high frequency loss of the second band antennas 142b.

A conducting wire connecting the first band antennas 142a may be connected to the first communication module 141a through the fifth layer L5 and the sixth layer L6 in the third substrate 1630.

The second communication module 141b may be disposed on the lower surface of the first substrate 1610. In order to reduce manufacturing cost, a substrate having a greater current loss than the third substrate 1630 may be used as the first substrate 1610. For example, the first substrate 1610 may be an FR4 PCB.

The conducting wire connecting the second band antennas 142b may pass through the first layer L1 to the sixth layer L6 and be connected to the second communication module 141b.

Figure 18:
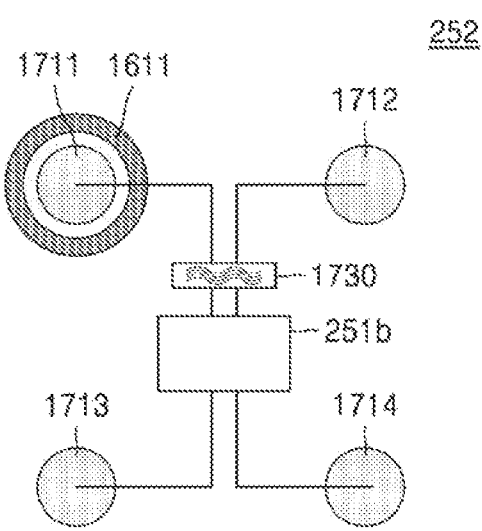
FIG. 18 is a plan view of an antenna unit included in an AR display device according to an embodiment.

FIG. 18 is a plan view of an antenna unit 252 included in the AR display device 200 according to an embodiment.

Referring to FIG. 18, the antenna unit 252 included in the AR display device 200 may include a first band antenna 1611 and second band antennas 1711 to 1714 (hereinafter referred to as 252b when there is no need to distinguish). The first band antenna 1611 of FIG. 17 may correspond to the first band antenna 252a of FIG. 6.

The first band antenna 1611 may receive a location notification signal output by the AR generator 100 and output the location notification signal generated therein to the AR generating device 100. The second band antennas 252b may receive a time-reversed data signal from the AR generating device 100 and transmit a time-reversed detection signal to the AR generating device 100.

The second band antennas 252b may be arranged in the form of a matrix of 2 rows and 2 columns. For reception of a large capacity file such as a data signal, the number of the second band antennas 252b may be greater than the number of the first band antennas 1611.

The first band antenna 1611 may have a ring shape. FIG. 18 illustrates that the first band antenna 1611 has a circular ring shape, but the present disclosure is not limited thereto. In other words, the first band antenna 1611 may have an elliptical ring or polygonal ring shape.

The shape of the second band antennas 252b may be circular, but is not limited thereto. In other words, the shape of the second band antennas 252b may be oval or polygonal.

Any one second band antenna 1711 of the second band antennas 1711 to 1714 may be disposed inside the first band antenna 1611.

Specifically, when the shape of the first band antenna 1611 is a circular ring, and the shape of the second band antennas 252b is circular, the inner diameter of the first band antenna 1611 may be greater than the outer diameters of the second band antennas 252b. Also, at least one second band antenna 1711 of the second band antennas 1711 to 1714 may be disposed inside the first band antenna 1611 but spaced apart from the first band antenna 1611. As the second band antenna 1711 disposed inside the first band antenna 1611 is spaced apart from the first band antenna 1611, interference between reception signals may be eliminated.

The first band antenna 1611 may be electrically connected to the first communication module 251a by a conducting wire. Each of the second band antennas 1711 to 1714 may be electrically connected to the second communication module 251b by the conducting wire.

Meanwhile, because the second band antennas 1711 to 1714 communicate in both directions, a band filter 1730 may be disposed between the second band antennas 1711 to 1714 and the second communication module 251b. According to an embodiment, the band filter 1730 may be disposed inside the second communication module 251b.

Figure 19:
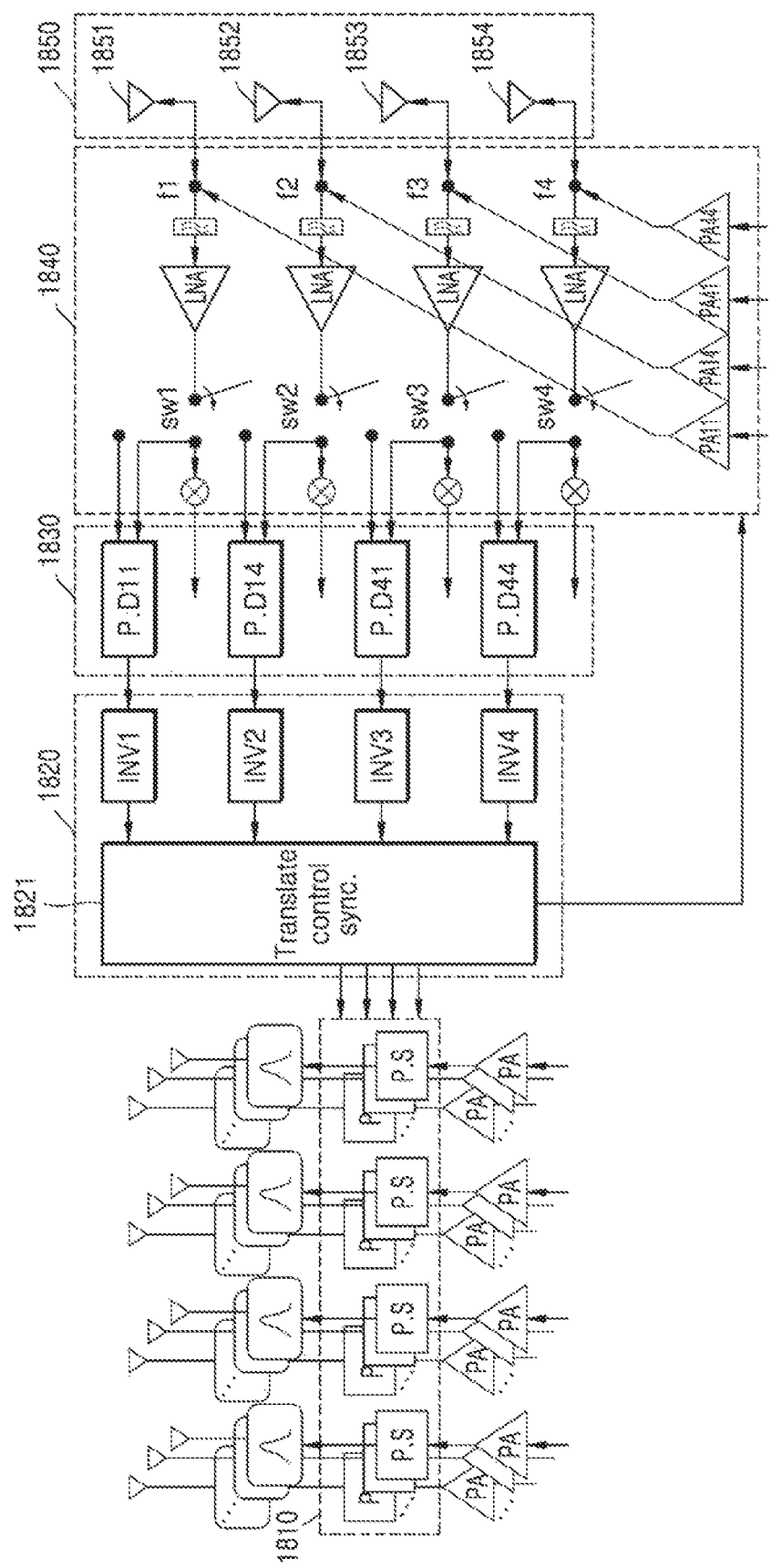
FIG. 19 illustrates an internal circuit diagram of an AR generating device according to an embodiment.

FIG. 19 illustrates an internal circuit diagram of the AR generating device 100 according to an embodiment.

Referring to FIG. 19, the AR generating device 100 may include an antenna unit 1850, a communication unit 1840, a phase detection unit 1830, a processor 1820, and a modulation unit 1810. The antenna unit 1850 and the communication unit 1840 of FIG. 19 may correspond to the antenna unit 142 and the communication unit 141 of FIG. 5, respectively, and the phase detection unit 1830, the processor 1820, and the modulation unit 1810 of FIG. 19 may correspond to the phase detection unit 143, the processor 110, and the modulation unit 144 of FIG. 9, respectively. In addition, the first band antenna 1185, the second band antenna 1852, the third band antenna 1853, and the fourth band antenna 1854 included in the antenna unit 1850 may correspond to the first band antenna 1411, the second band antenna 1412, the third band antenna 1413, and the fourth band antenna 1414 of FIGS. 16A to 16B, respectively.

The antenna unit 1850 may receive at least one location notification signal through a first frequency band. Also, the antenna unit 1850 may transmit a location notification signal to the communication unit 1840.

The communication unit 1840 may include a plurality of filters f1 to f4 and low noise amplifiers (LNAs), filter and amplify the location notification signal, and transmit the location notification signal to the phase detection unit 1830.

Meanwhile, the communication unit 1840 may include a plurality of switching elements sw1 to sw4, and control the switching elements sw1 to sw4 according to a mode. For example, the communication unit 1840 may control on and off of the switching elements sw1 to sw4 according to a first mode for receiving the location notification signal output from the AR display device 200 or a second mode for outputting the location notification signal generated therein. When outputting the location notification signal generated therein, the communication unit 1840 may amplify and output the location notification signal through power amplifiers PA11, PA14, PA41, and PA44 connected to the first band antennas 1185 to 1854, respectively.

The phase detection unit 1830 may include a plurality of phase sensors P.D11, P.D14, P.D41, and P.D44, and detect the phase of the location notification signal received by each of the first band antennas 1851 to 1854. The phase detection unit 1830 may transmit phase information of the location notification signal to the processor 1820.

The processor 1820 may include a plurality of time reversers INV1 to INV4 and a synchronizer 1821. The time reversers INV1 to INV4 may time-reverse the phase of the location notification signal. The synchronizer 1821 may convert the time-reversed phase of the location notification signal received through the first frequency band to the second frequency band, and may output a control signal for synchronizing the converted time-reversed phase to the period of a data signal.

The modulation unit 1810 may modulate the phase of at least one data signal based on the control signal. The modulated data signal may be filtered and output through a band filter.

Figure 20:
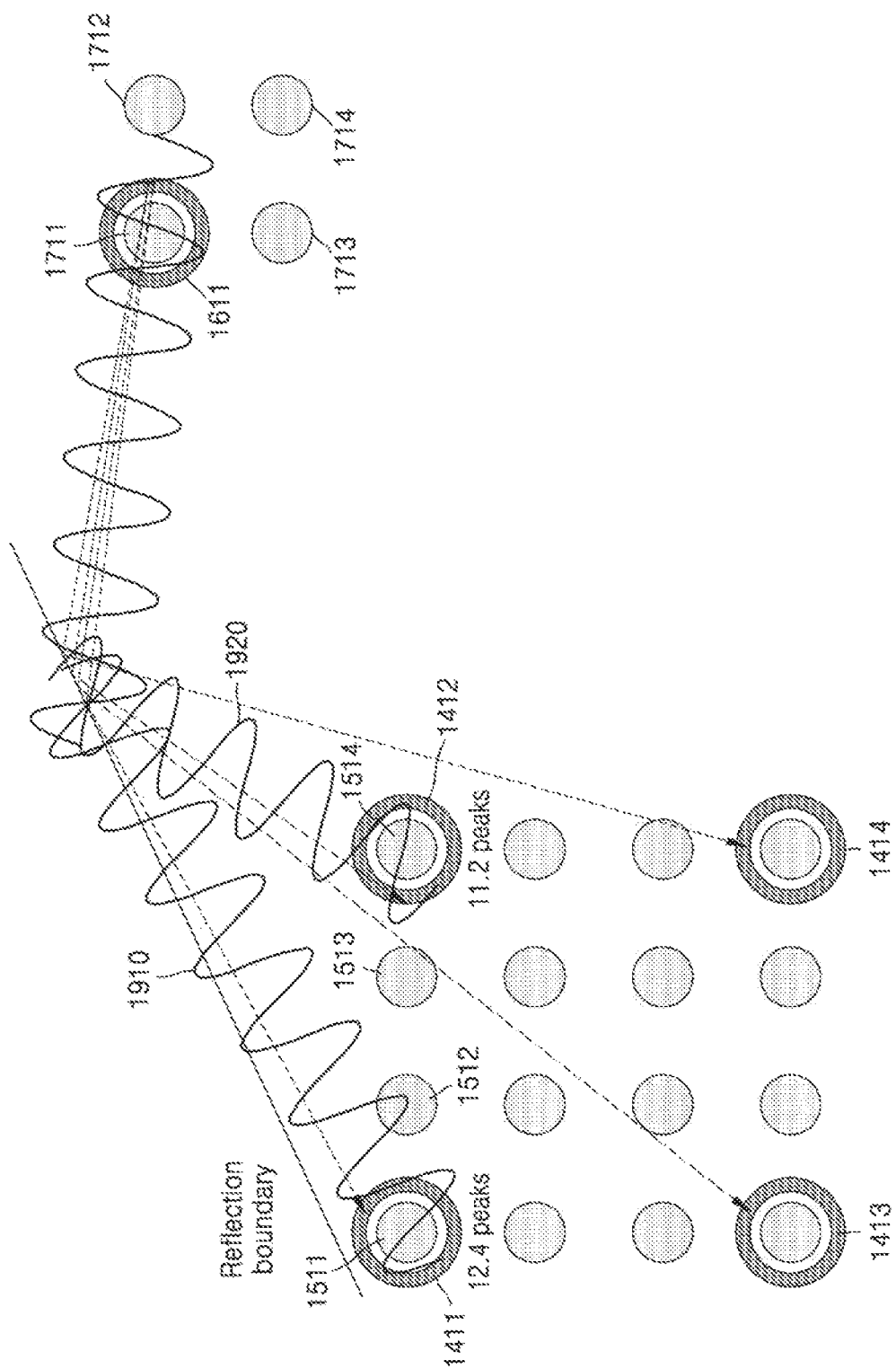
FIG. 20 is a diagram illustrating a phase conversion method between a first frequency band and a second frequency band according to an embodiment.
Figure 21:
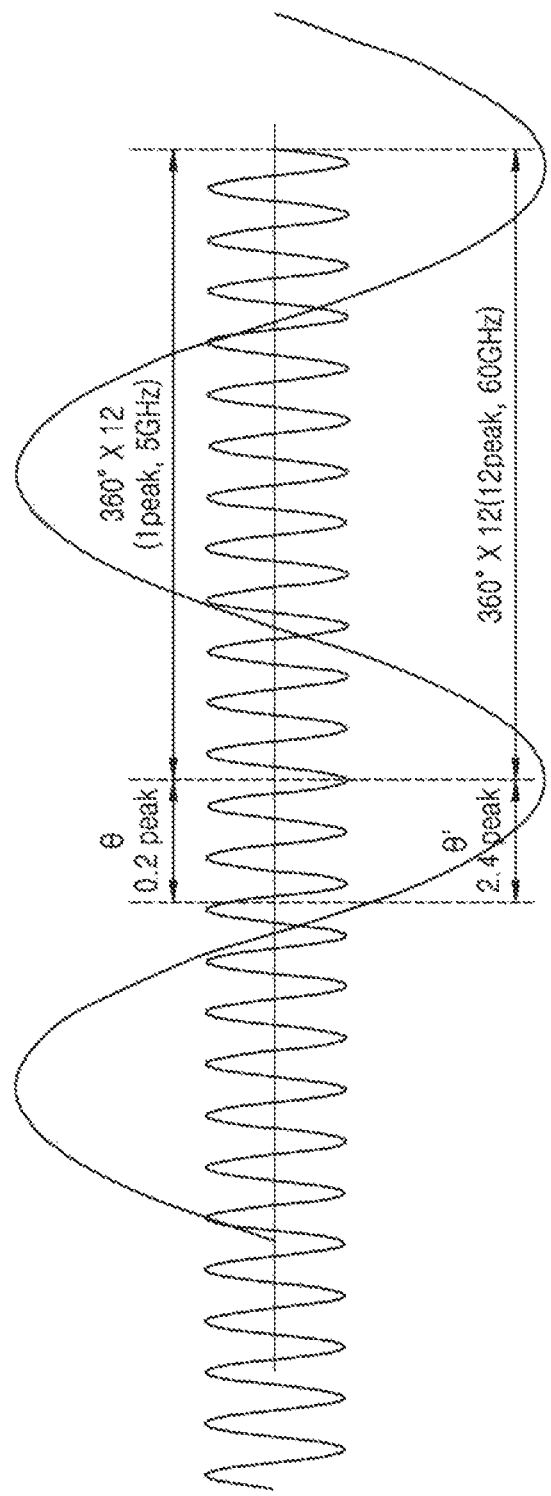
FIG. 21 is a diagram illustrating a phase conversion method between a first frequency band and a second frequency band according to an embodiment.

FIGS. 20 to 21 are diagrams illustrating a phase conversion method between a first frequency band and a second frequency band according to an embodiment.

Meanwhile, FIG. 21 illustrates that the first frequency band is 5 GHz for convenience of description, but the first frequency band may be 2.4 GHz or 5.8 GHz.

As described above, the AR generating device 100 may calculate a time-reversed phase of a location notification signal received from the AR display device 200 and modulate a data signal based on the time-reversed phase of the location notification signal. At this time, because frequency bands of the location notification signal and the data signal are different, it is necessary to translate the time-reversed phase of the location notification signal in order to accurately transmit the data signal. Hereinafter, for convenience of explanation, the AR generating device 100 mainly converts the time-reversed phase of the location notification signal, but the AR display device 200 may also convert the time-reversed phase of the location notification signal.

Referring to FIG. 20, FIG. 20 illustrates that the first band antennas 1411 to 1414 included in the AR generating device 100 receive location notification signals output from the AR display device 200.

In FIG. 20, any one first band antennas 1411 of the plurality of first band antennas 1411 to 1414 may receive the first location notification signal 1910, and the other first band antennas 1414 may receive the second location notification signal 1920.

The processor 110 may convert the time-reversed phase of the first location notification signal 1910 received through the first frequency band to correspond to the second frequency band. In other words, the processor 110 may calculate the time-reversed phase of the first data signal transmitted by the second band antenna 1511 disposed inside the first band antenna 1411 based on the time-reversed phase of the first location notification signal 1910 received by the first band antenna 1411.

Specifically, the processor 110 may complex-conjugate the wave of the first location notification signal 1910 to calculate the time-reversed phase of the first location notification signal 1910.

The processor 110 may calculate a time-reversed phase of the first data signal by multiplying the time-reversed phase of the first location notification signal 1910 by a preset factor. The preset factor may be set as a value obtained by dividing the frequency value of the second frequency band by the frequency value of the first frequency band. For example, when the first frequency band is 60 GHz and the second frequency band is 5 GHz, the factor may be set to 12. The processor 110 may modulate and output the phase of the first data signal so as to be a value obtained by multiplying the time-reversed phase of the first position notification signal 1910 by 12.

Meanwhile, as illustrated in FIG. 20, because paths of the location notification signals output by the AR display device 200 are different from each other, phases of the location notification signals received by the first band antennas 1411 to 1414 may be different from each other. The phases of these location notification signals may be expressed in the number of peaks. For example, the number of peaks of the first location notification signal 1910 received by any one first band antenna 1411 of the plurality of first band antennas 1411 to 1414 may be 12.4 peaks, and the phase of the second location notification signal 1920 received by the other first band antenna 1412 may be 11.2 peaks.

The processor 110 may calculate the time-reversed phase of the second data signal based on a difference in the number of peaks of the first location notification signal 1910 and the second location notification signal 1920. In other words, the processor 110 may calculate the time-reversed phase of the second data signal transmitted by the second band antenna 1514 disposed inside the first band antenna 1412 based on the difference in the number of peaks of the first location notification signal 1910 and the second location notification signal 1920.

Specifically, the processor 110 may obtain a difference in the number of first peaks of the first location notification signal 1910 and the second location notification signal 1920. The processor 110 may calculate a difference in the number of second peaks corresponding to the second frequency band by multiplying the difference in the number of first peaks by a preset factor. For example, as shown in FIG. 20, when the difference in the number of first peaks between the first location notification signal 1910 and the second location notification signal 1920 is 1.2 peaks and the preset factor is 12, the difference in the number of second peaks corresponding to the second frequency band may be 2.4 peaks, as shown in FIG. 21. The processor 110 may time-reverse a phase corresponding to 2.4 peaks to calculate the time-reversed phase of the second data signal.

The processor 110 may calculate the time-reversed phase of the second data signal transmitted by the second band antennas 1512 and 1513 based on the number of the second band antennas 1512 and 1513 disposed between the first band antenna 1411 receiving the first location notification signal 1910 and the first band antenna 1412 receiving the second location notification signal 1920. For example, the processor 110 may calculate the time-reversed phase of the data signal transmitted by each of the second band antennas 1511 to 1514 on the assumption that the second band antennas 1511 to 1514 are spaced apart from each other at the same interval.

Meanwhile, as shown in FIG. 20, because the AR display device 200 has one first band antenna 1711, the AR display device 200 may not calculate the time-reversed phase of the second data signal based on the difference in the number of peaks, like the AR generating device 100. Accordingly, the processor 210 included in the AR display device 200 may calculate a time-reversed phase of a detection signal based on the interval between the second band antennas 1711 to 1714.

Specifically, the processor 210 may calculate a time-reversed phase of a first detection signal transmitted by the second band antenna 1711 disposed inside the first band antenna 1611 by multiplying the time-reversed phase of the first band antenna 1611 that has received the first location notification signal 1910 by a preset factor.

In addition, the processor 110 may calculate a time-reversed phase of a second detection signal transmitted by each of the second band antennas 1711 to 1714 on the assumption that the second band antennas 1711 to 1714 are spaced apart from each other at the same interval.

Figure 22:
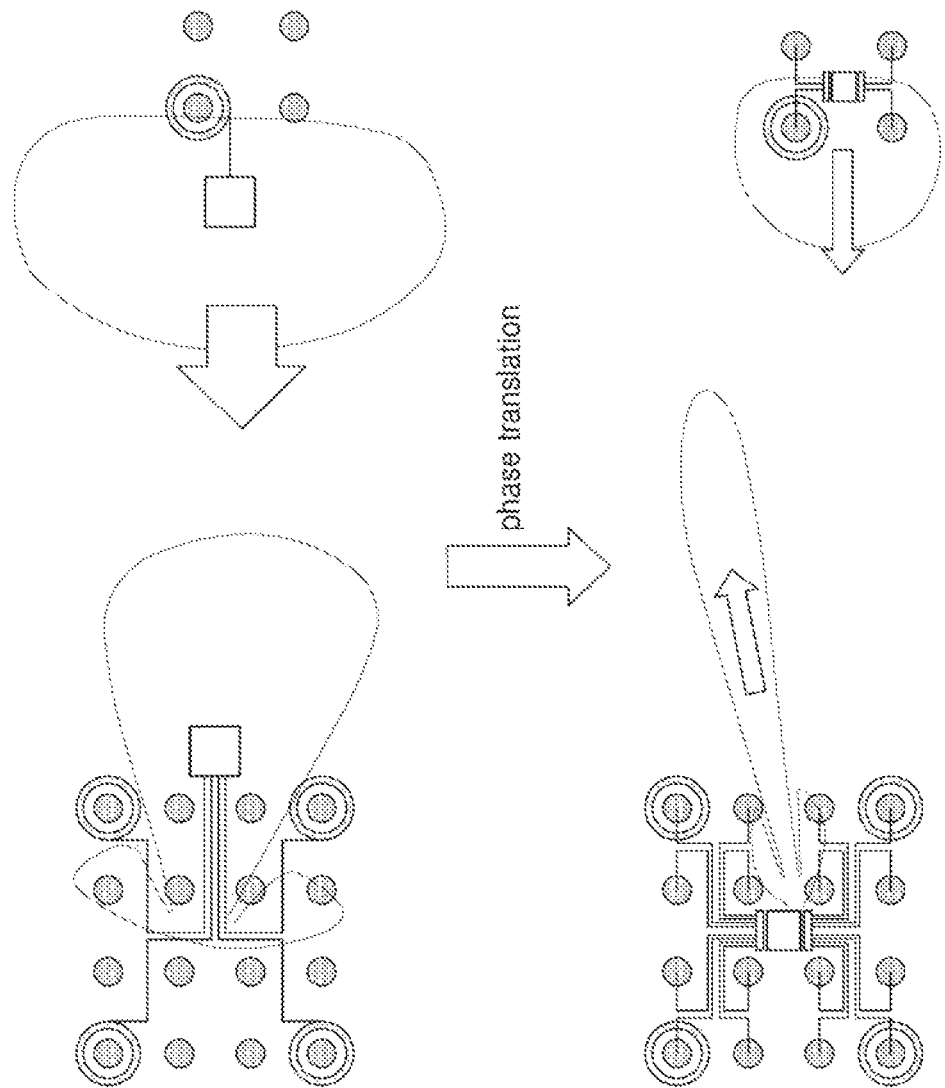
FIG. 22 is a diagram illustrating a method of correcting a beam forming angle after phase conversion between a first frequency band and a second frequency band according to an embodiment.

FIG. 22 is a diagram illustrating a method of correcting a beam forming angle after phase conversion between a first frequency band and a second frequency band according to an embodiment.

As described above, the AR system 10 of the present disclosure does not directly modulate the phase of a data signal or the phase of a detection signal to the time-reversed phase of a location indication signal. In other words, the AR system 10 of the present disclosure needs to convert the time-reversed phase of the location notification signal to correspond to the second frequency band.

However, the number of first band antenna and second band antenna is different, and intervals of the second band antennas may not be the same. Accordingly, when a frequency band is converted, beamforming performance may be reduced as shown in FIG. 22.

The processors 110 and 210 may correct the beamforming angle based on received signal strength indicator (RSSI) of the data signal or the detection signal to improve the beamforming performance. For example, the processors 110 and 210 may correct the beamforming angle such that the RSSI of the data signal or the detection signal is maximum.

Figure 23:
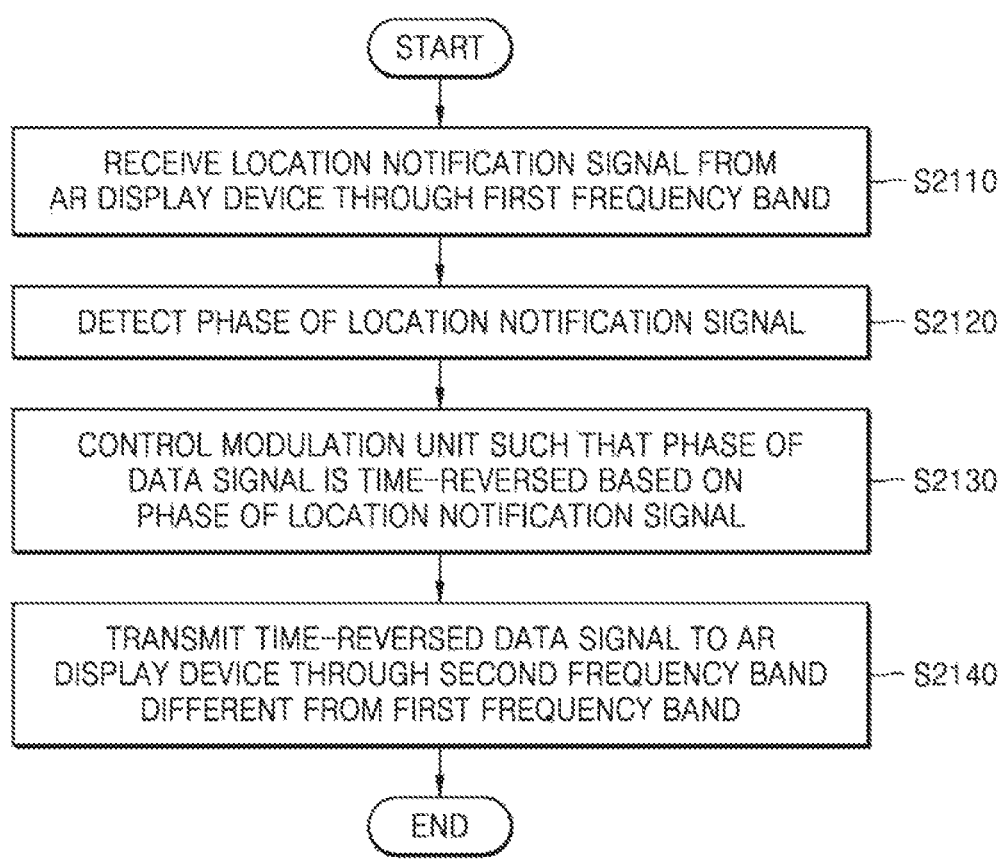
FIG. 23 is a diagram illustrating an operation method of an AR generating device according to an embodiment.

FIG. 23 is a diagram illustrating an operation method of the AR generating device 100 according to an embodiment.

Referring to the drawing, in operation S2110, the AR generating device 100 may receive a location notification signal from the AR display device 200 through a first frequency band. The first frequency band may be a band supporting low power communication. For example, the first frequency band may be 2.4 GHz or 5.8 GHz.

In operation S2120, the AR generating device 100 may detect the phase of the location notification signal.

In operation S2130, the AR generating device 100 may control the modulation unit such that the phase of the data signal is time-reversed based on the phase of the location notification signal.

The AR generating device 100 may complex-conjugate the wave of the location notification signal to calculate the time-reversed phase of the location notification signal.

When receiving the first location notification signal, the AR generating device 100 may calculate the time-reversed phase of a first data signal by multiplying the time-reversed phase of the first location notification signal by a preset factor. The preset factor may be set as a value obtained by dividing the frequency value of a second frequency band by the frequency value of the first frequency band.

When the AR generating device 100 further receives a second location notification signal, the AR generating device 100 may obtain a difference in the number of first peaks of the first location notification signal and the second location notification signal, and multiply the difference in the number of first peaks by a preset factor to calculate the number of second peaks. The AR generating device 100 may calculate the time-reversed phase of a second data signal based on the number of second peaks.

In operation S2140, the AR generating device 100 may transmit the time-reversed data signal to the AR display device 200 through a second frequency band different from the first frequency band.

The second frequency band may be a broadband communication module supporting ultra high speed communication and near field communication. For example, the second frequency band may be 60 GHz.

The AR generating device 100 may correct the beamforming angle based on the RSSI of the data signal. The RSSI of the data signal may be measured by the AR display device 200.

Figure 24:
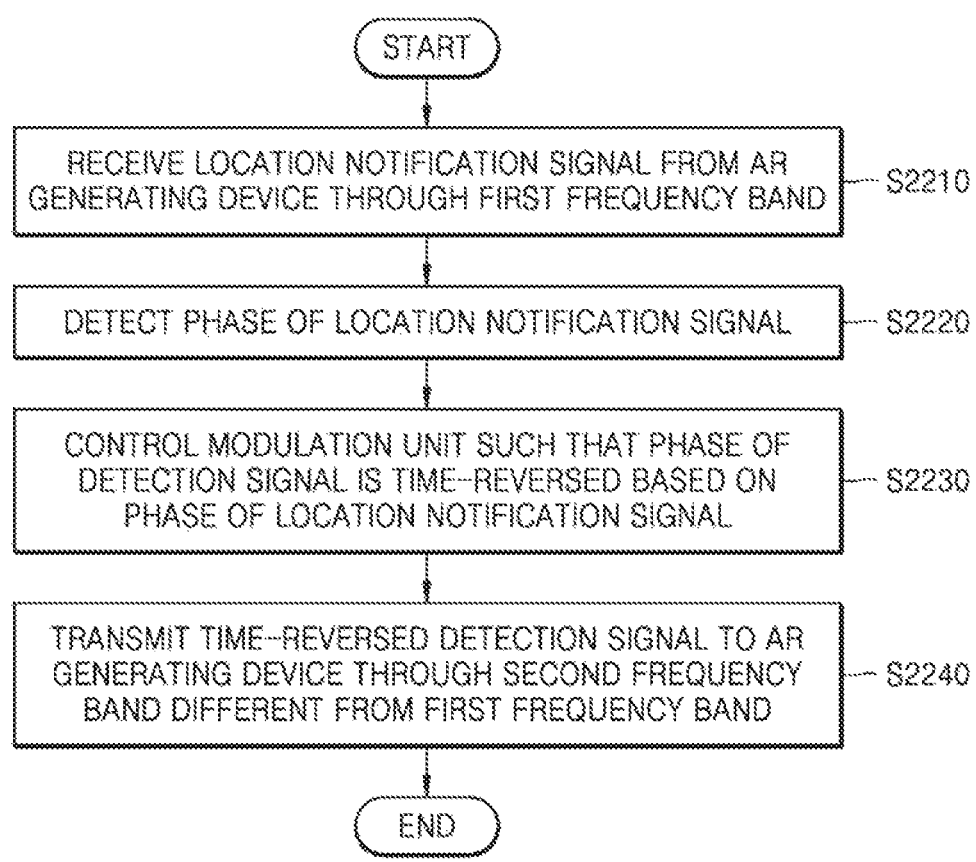
FIG. 24 is a diagram illustrating an operation method of an AR display device according to an embodiment.

FIG. 24 is a diagram illustrating an operation method of the AR display device 200 according to an embodiment.

Referring to FIG. 24, in operation S2210, the AR display device 200 may receive a location notification signal from the AR generating device 100 through the first frequency band. The first frequency band may be a band supporting low power communication. For example, the first frequency band may be 2.4 GHz or 5.8 GHz.

In operation S2220, the AR display device 200 may detect the phase of the location notification signal.

In operation S2230, the AR display device 200 may control the modulation unit such that the phase of a detection signal is time-reversed based on the phase of the location notification signal.

The AR display device 200 may complex-conjugate the wave of the location notification signal to calculate the time-reversed phase of the location notification signal.

When receiving the first location notification signal, the AR display device 200 may calculate the time-reversed phase of a first detection signal by multiplying the time-reversed phase of a first location notification signal by a preset factor. The preset factor may be set as a value obtained by dividing the frequency value of a second frequency band by the frequency value of the first frequency band.

When the AR display device 200 further receives a second location notification signal, the AR display device 200 may calculate the time-reversed phase of a second detection signal based on the time-reversed phase of the first detection signal and the interval between second band antennas.

In operation S2240, the AR display device 200 may transmit the time-reversed detection signal to the AR generating device 100 through the second frequency band different from the first frequency band.

The second frequency band may be a broadband communication module supporting ultra high speed communication and near field communication. For example, the second frequency band may be 60 GHz.

The AR display device 200 may correct the beamforming angle based on the RSSI of the detection signal. The RSSI of the detection signal may be measured by the AR generating device 100.

FIG. 25 is a diagram illustrating an operation method of an AR system according to an embodiment.

Referring to FIG. 25, in operation S2311, the AR display device 200 may output a detection signal. The detection signal may be obtained from the camera 231 and the detection unit 220. For example, the detection signal may include image information obtained by the camera 231. Also, the detection signal may include head movement information of a user, gaze information, focus information, gesture information, etc.

In operation S2312, the AR generating device 100 may output a data signal. The data signal may be generated based on the detection signal. For example, the data signal may be an image signal or an image signal of an AR object registered in a rendered 3D space.

In operation S2313, the AR display device 200 may generate a location notification signal. In operation S2314, the AR generating device 100 may generate a location notification signal. The location notification signal may be a beacon signal.

In operation S2315, the AR display device 200 may transmit the location notification signal to the AR generating device 100 through a first frequency band. In operation S2316, the AR generating device 100 may transmit the location notification signal to the AR display device 200 through the first frequency band. The first frequency band may be a band supporting low power communication. For example, the first frequency band may be 2.4 GHz or 5.8 GHz.

In operation S2317, the AR display device 200 may detect the phase of the location notification signal. In operation S2318, the AR generating device 100 may detect the phase of the location notification signal.

In operation S2319, the AR display device 200 may control a modulation unit such that the phase of the detection signal is time-reversed based on the phase of the location notification signal. In operation S2320, the AR generating device 100 may control the modulation unit such that the phase of the data signal is time-reversed based on the phase of the location notification signal. A method of modulating the detection signal refers to FIG. 24 and a method of modulating the data signal refers to FIG. 25.

In operation S2321, the AR display device 200 may transmit the time-reversed detection signal to the AR generating device 100 through a second frequency band. In operation S2322, the AR generating device 100 may transmit the time-reversed data signal to the AR display device 200 through the second frequency band. The second frequency band may be a broadband communication module supporting ultra high speed communication and near field communication. For example, the second frequency band may be 60 GHz.

The AR display device 200 may display the AR object based on the time-reversed data signal. The AR generating device 100 may generate an AR object based on the time-reversed detection signal.

In operation S2323, the AR generating device 100 may transmit the detection signal to the server 300 through a third frequency band. The third frequency band may be a 5G communication band. For example, the third frequency band may be 3.5 GHz or 28 GHz.

In operation S2324, the server 300 may transmit the detection signal to each AR generating device.

Specifically, the server 300 may transmit a first detection signal received from the first AR generating device 100-1 to the second AR generating device 100-2. In addition, the server 300 may transmit a second detection signal received from the second AR generating device 100-2 to the first AR generating device 100-1. The server 300 enables interaction between multiple users.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An augmented reality (AR) generating device comprising:
    a modulator configured to modulate a first phase of at least one data signal comprising information about an AR object;
    a phase detector configured to detect a second phase of at least one location notification signal received from an AR display device;
    a processor configured to control the modulator to time-reverse the first phase of the at least one data signal based on the second phase of the at least one location notification signal; and
    a plurality of antennas configured to receive the at least one location notification signal in a first frequency band from the AR display device and transmit the time-reversed at least one data signal to the AR display device in a second frequency band different from the first frequency band.

2. The AR generating device of claim 1, wherein the plurality of antennas comprise:
    a plurality of first band antennas configured to receive the at least one location notification signal; and
    a plurality of second band antennas configured to receive a detection signal for generating the AR object from the AR display device and transmit the time-reversed at least one data signal to the AR display device.

3. The AR generating device of claim 2, wherein
    the plurality of first band antennas are ring-shaped, and
    wherein at least one of the plurality of second band antennas is arranged inside any one of the plurality of first band antennas.

4. The AR generating device of claim 1, wherein the at least one location notification signal comprises a first location notification signal, and
    wherein the processor is further configured to calculate a time-reversed phase of a first data signal by multiplying a time-reversed phase of the first location notification signal by a preset factor.

5. The AR generating device of claim 4, wherein the at least one location notification signal further comprises a second location notification signal, and
    wherein the processor is further configured to
        obtain a difference in a number of first peaks between the first location notification signal and the second location notification signal,
        calculate a number of second peaks by multiplying the difference in the number of first peaks by the preset factor, and
        calculate a time-reversed phase of a second data signal based on the number of second peaks.

6. The AR generating device of claim 5, wherein the processor is further configured to set a value obtained by dividing a frequency value of the second frequency band by a frequency value of the first frequency band as the preset factor.

7. The AR generating device of claim 1, wherein the processor is further configured to adjust a beamforming angle of the at least one data signal based on a received signal strength indicator (RSSI) of the at least one data signal.

8. The AR generating device of claim 1, wherein the second frequency band is set larger than the first frequency band.

9. The AR generating device of claim 1, wherein the at least one location notification signal is a beacon signal.

10. An augmented reality (AR) display device comprising:
- a modulator configured to modulate a first phase of at least one detection signal comprising information about an AR object;
- a phase detector configured to detect a second phase of at least one location notification signal received from an AR generating device;
- a processor configured to control the modulator to time-reverse the first phase of the at least one detection signal based on the second phase of the at least one location notification signal; and
- a plurality of antennas configured to receive the at least one location notification signal from the AR generating device in a first frequency band and transmit the time-reversed at least one detection signal to the AR generating device in a second frequency band different from the first frequency band.

11. The AR display device of claim 10, wherein the plurality of antennas comprise:
- a first band antenna configured to receive the at least one location notification signal; and
- a plurality of second band antennas configured to receive a data signal from the AR generating device and transmit the time-reversed at least one detection signal to the AR generating device.

12. The AR display device of claim 11, wherein
the first band antenna is ring-shaped, and
wherein at least one of the plurality of second band antennas is disposed inside the first band antenna.

13. The AR display device of claim 10, wherein the at least one detection signal comprises a first detection signal, and the at least one location notification signal comprises a first location notification signal, and
wherein the processor is further configured to calculate a time-reversed phase of the first detection signal by multiplying a time-reversed phase of the first location notification signal by a preset factor.

14. The AR display device of claim 13, wherein the at least one detection signal further comprises a second detection signal, and
wherein the processor is further configured to calculate a time-reversed phase of the second detection signal based on the time-reversed phase of the first detection signal and an interval between band antennas included in the plurality of antennas.

15. The AR display device of claim 14, wherein the processor is further configured to set a value obtained by dividing a frequency value of the second frequency band by a frequency value of the first frequency band as the preset factor.

16. The AR display device of claim 10, wherein the processor is further configured to adjust a beamforming angle of the at least one detection signal based on a received signal strength indicator (RSSI) of the at least one detection signal.

17. The AR display device of claim 10, wherein the second frequency band is set larger than the first frequency band.

18. The AR display device of claim 10, wherein the at least one location notification signal is a beacon signal.

19. An augmented reality (AR) system comprising a server, a plurality of AR generating devices wirelessly connected to the server, and a plurality of AR display devices respectively wirelessly connected to the plurality of AR generating devices,
wherein each of the plurality of AR display device is configured to:
- output at least one detection signal by detecting information for generating an AR object;
- detect a phase of at least one location notification signal received from the plurality of AR generating devices that are wirelessly connected to the plurality of AR display devices in a first frequency band, respectively;
- time-reverse the at least one detection signal based on the phase of the at least one location notification signal; and
- transmit the time-reversed at least one detection signal to each of the plurality of AR generating devices in a second frequency band different from the first frequency band, and wherein each of the plurality of AR generating devices is configured to
transmit the at least one detection signal to the server in a third frequency band different from the first frequency band and the second frequency band.

20. The AR system of claim 19, wherein the server is configured to transmit the at least one detection signal to a first AR generating device of the plurality of AR generating devices when receiving the at least one detection signal from a second AR generating device of the plurality of AR generating devices.

* * * * *